US012718748B2

(12) United States Patent
Kim et al.

(10) Patent No.: US 12,718,748 B2
(45) Date of Patent: Aug. 25, 2026

(54) GATE DRIVER AND ELECTRONIC DEVICE

(71) Applicant: Samsung Display Co., LTD., Yongin-si (KR)

(72) Inventors: Jaesang Kim, Yongin-si (KR); Seongjoo Lee, Yongin-si (KR); Ohjo Kwon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/249,153

(22) Filed: Jun. 25, 2025

(65) Prior Publication Data

US 2026/0105882 A1 Apr. 16, 2026

(30) Foreign Application Priority Data

Oct. 16, 2024 (KR) ........................ 10-2024-0141614

(51) Int. Cl.
*G09G 3/32* (2016.01)

(52) U.S. Cl.
CPC ....... *G09G 3/32* (2013.01); *G09G 2300/0814* (2013.01); *G09G 2300/0819* (2013.01); *G09G 2310/0267* (2013.01); *G09G 2310/0289* (2013.01); *G09G 2310/0291* (2013.01); *G09G 2310/08* (2013.01); *G09G 2330/021* (2013.01)

(58) Field of Classification Search
CPC ............. G09G 3/32; G09G 2300/0814; G09G 2300/0819; G09G 2310/0267; G09G 2310/0289; G09G 2310/0291; G09G 2330/021
See application file for complete search history.

(56) References Cited

U.S. PATENT DOCUMENTS

2017/0186363 A1* 6/2017 Park ..................... G09G 3/3266
2018/0059829 A1* 3/2018 Chen ................... G06F 3/04184

FOREIGN PATENT DOCUMENTS

KR 1020200048784 A 5/2020

* cited by examiner

*Primary Examiner* — Lisa S Landis
(74) *Attorney, Agent, or Firm* — CANTOR COLBURN LLP

(57) ABSTRACT

A gate driver includes a plurality of stages. At least one stage of the plurality of stages includes a logic circuit configured to generate an intermediate carry signal and a carry output signal by sampling a carry input signal based on a clock signal, and to generate an intermediate gate signal by performing a logic operation on an output enable signal, the intermediate carry signal and the carry output signal, a level shifting circuit configured to generate a gate signal by shifting a voltage level of the intermediate gate signal, and a buffer circuit configured to output the gate signal at a gate output node when a high impedance signal has a first level, and to float the gate output node when the high impedance signal has a second level.

20 Claims, 11 Drawing Sheets

GATE DRIVER AND ELECTRONIC DEVICE

This application claims priority to Korean Patent Application No. 10-2024-0141614, filed on Oct. 16, 2024, and all the benefits accruing therefrom under 35 U.S.C. § 119, the content of which in its entirety is herein incorporated by reference.

BACKGROUND

1. Field

Embodiments of the invention relate to a display device, and more particularly to a gate driver, and an electronic device including the gate driver.

2. Description of the Related Art

A display device, such as an organic light-emitting diode ("OLED") display device, may include a display panel that includes a plurality of pixels, a data driver that provides data signals to the plurality of pixels, a gate driver (e.g., a scan driver and/or an emission driver) that provides gate signals to the plurality of pixels through a plurality of gate lines, and a controller that controls the data driver and the gate driver.

Depending on a load of the display panel, an image quality, etc., the gate driver may be arranged only on one side of the display panel to provide the gate signal from one end of each gate line, or two gate drivers may be arranged on opposite sides (e.g., left and right sides) of the display panel to provide the same gate signal from opposite ends of each gate line.

SUMMARY

Some embodiments provide a gate driver that is selectively activated in response to a high impedance signal.

Some embodiments provide a display device that selectively activates gate drivers arranged on opposite sides (e.g., left and right sides) of a display panel.

According to embodiments, there is provided a gate driver including a plurality of stages. At least one stage of the plurality of stages includes a logic circuit configured to generate an intermediate carry signal and a carry output signal by sampling a carry input signal based on a clock signal, and to generate an intermediate gate signal by performing a logic operation on an output enable signal, the intermediate carry signal and the carry output signal, a level shifting circuit configured to generate a gate signal by shifting a voltage level of the intermediate gate signal, and a buffer circuit configured to output the gate signal at a gate output node when a high impedance signal has a first level, and to float the gate output node when the high impedance signal has a second level.

In embodiments, while the high impedance signal has the second level, the logic circuit may perform a masking operation, which converts the clock signal into a low power supply voltage.

In embodiments, the buffer circuit may include a first P-type metal-oxide-semiconductor (PMOS) transistor configured to output a high gate voltage as the gate signal at the gate output node in response to a voltage of a first control node, a first N-type metal-oxide-semiconductor (NMOS) transistor configured to output a low gate voltage as the gate signal at the gate output node in response to a voltage of a second control node, a second PMOS transistor configured to transfer the high gate voltage to the first control node in response to an inverted high impedance signal, and a second NMOS transistor configured to transfer the low gate voltage to the second control node in response to the high impedance signal.

In embodiments, the first PMOS transistor may include a gate connected to the first control node, a first terminal which receives the high gate voltage, and a second terminal connected to the gate output node, the first NMOS transistor may include a gate connected to the second control node, a first terminal which receives the low gate voltage, and a second terminal connected to the gate output node, the second PMOS transistor may include a gate which receives the inverted high impedance signal, a first terminal which receives the high gate voltage, and a second terminal connected to the first control node, and the second NMOS transistor may include a gate which receives the high impedance signal, a first terminal which receives the low gate voltage, and a second terminal connected to the second control node.

In embodiments, the buffer circuit may further include a first inverter configured to generate an inverted gate signal by inverting the gate signal, a first transmission gate configured to transfer the inverted gate signal to the first control node in response to the high impedance signal and the inverted high impedance signal, and a second transmission gate configured to transfer the inverted gate signal to the second control node in response to the high impedance signal and the inverted high impedance signal.

In embodiments, the logic circuit may include a first AND gate configured to perform an AND operation on the clock signal and an inverted high impedance signal, a first flip-flop configured to output the intermediate carry signal by sampling the carry input signal at a rising edge of an output signal of the first AND gate, a second inverter configured to invert the output signal of the first AND gate, a second flip-flop configured to output the carry output signal by sampling the intermediate carry signal at a rising edge of an output signal of the second inverter, a second AND gate configured to perform an AND operation on the output enable signal and the intermediate carry signal, and a NAND gate configured to generate the intermediate gate signal by performing a NAND operation on an output signal of the second AND gate and the carry output signal.

In embodiments, the level shifting circuit may include a first level shifter configured to convert a high power supply voltage of the intermediate gate signal into a high gate voltage when the intermediate gate signal has the high power supply voltage, and a second level shifter configured to convert a low power supply voltage of the intermediate gate signal into a low gate voltage when the intermediate gate signal has the low power supply voltage, and to output the gate signal, which has the high gate voltage or the low gate voltage.

In embodiments, the level shifting circuit may further include a third inverter configured to generate an inverted intermediate gate signal by inverting the intermediate gate signal. The first level shifter may include a third NMOS transistor configured to transfer the low power supply voltage to a first node in response to the intermediate gate signal, a fourth NMOS transistor configured to transfer the low power supply voltage to a second node in response to the inverted intermediate gate signal, a third PMOS transistor configured to transfer the high gate voltage to the first node in response to a voltage of the second node, a fourth PMOS transistor configured to transfer the high gate voltage to the second node in response to a voltage of the first node, a fourth inverter configured to invert the voltage of the first node, and a fifth inverter configured to invert the voltage of the second node. The second level shifter may include a fifth PMOS transistor configured to transfer the high gate voltage to a third node in response to an output signal of the fourth inverter, a sixth PMOS transistor configured to transfer the high gate voltage to a fourth node in response to an output signal of the fifth inverter, a fifth NMOS transistor configured to transfer the low gate voltage to the third node in response to a voltage of the fourth node, a sixth NMOS transistor configured to transfer the low gate voltage to the fourth node in response to a voltage of the third node, a sixth inverter configured to generate the gate signal, which has the high gate voltage or the low gate voltage by inverting the voltage of the third node, and a seventh inverter configured to invert the voltage of the fourth node.

In embodiments, the third NMOS transistor may include a gate which receives the intermediate gate signal, a first terminal which receives the low power supply voltage, and a second terminal connected to the first node, the fourth NMOS transistor may include a gate which receives the inverted intermediate gate signal, a first terminal which receives the low power supply voltage, and a second terminal connected to the second node, the third PMOS transistor may include a gate connected to the second node, a first terminal which receives the high gate voltage, and a second terminal connected to the first node, the fourth PMOS transistor may include a gate connected to the first node, a first terminal which receives the high gate voltage, and a second terminal connected to the second node, the fifth PMOS transistor may include a gate connected to an output terminal of the fourth inverter, a first terminal which receives the high gate voltage, and a second terminal connected to the third node, the sixth PMOS transistor may include a gate connected to an output terminal of the fifth inverter, a first terminal which receives the high gate voltage, and a second terminal connected to the fourth node, the fifth NMOS transistor may include a gate connected to the fourth node, a first terminal which receives the low gate voltage, and a second terminal connected to the third node, and the sixth NMOS transistor may include a gate connected to the third node, a first terminal which receives the low gate voltage, and a second terminal connected to the fourth node.

In embodiments, the buffer circuit may include a plurality of inverters connected in series, and configured to buffer the gate signal, and a transmission gate configured to transfer the gate signal output from the plurality of inverters to the gate output node in response to the high impedance signal and an inverted high impedance signal.

In embodiments, the transmission gate may output the gate signal output from the plurality of inverters at the gate output node when the high impedance signal has the first level and the inverted high impedance signal has the second level, and may not output the gate signal when the high impedance signal has the second level and the inverted high impedance signal has the first level.

According to embodiments, there is provided an electronic device including a processor configured to provide input image data, and a display device configured to receive the input image data from the processor, and to display an image based on the input image data. The display device includes a display panel including a plurality of gate lines, and a plurality of pixels connected to the plurality of gate lines, a data driver configured to provide data signals to the plurality of pixels, a first gate driver arranged on a first side of the plurality of pixels, and configured to provide gate signals to the plurality of pixels through the plurality of gate lines, a second gate driver arranged on a second side of the plurality of pixels opposite to the first side, and configured to provide the gate signals to the plurality of pixels through the plurality of gate lines, and a controller configured to provide a start signal, a clock signal, an output enable signal and a first high impedance signal to the first gate driver, and to provide the start signal, the clock signal, the output enable signal and a second high impedance signal to the second gate driver. The first gate driver includes a plurality of first stages, and the second gate driver includes a plurality of second stages. At least one stage among the plurality of first stages and the plurality of second stages includes a logic circuit configured to generate an intermediate carry signal and a carry output signal by sampling a carry input signal based on the clock signal, and to generate an intermediate gate signal by performing a logic operation on the output enable signal, the intermediate carry signal and the carry output signal, a level shifting circuit configured to generate a gate signal corresponding to one of the gate signals by shifting a voltage level of the intermediate gate signal, and a buffer circuit configured to output the gate signal at a gate output node when a high impedance signal corresponding to one of the first high impedance signal and the second high impedance signal has a first level, and to float the gate output node when the high impedance signal has a second level.

In embodiments, when both the first high impedance signal and the second high impedance signal have the first level, the first gate driver and the second gate driver may provide the gate signals to the plurality of pixels through the plurality of gate lines from both the first side and the second side of the plurality of pixels. When the first high impedance signal has the first level and the second high impedance signal has the second level, the first gate driver may provide the gate signals to the plurality of pixels through the plurality of gate lines from the first side of the plurality of pixels, and gate output nodes of the plurality of second stages of the second gate driver may be floated. When the first high impedance signal has the second level and the second high impedance signal has the first level, the second gate driver may provide the gate signals to the plurality of pixels through the plurality of gate lines from the second side of the plurality of pixels, and gate output nodes of the plurality of first stages of the first gate driver may be floated.

In embodiments, when the first high impedance signal has the first level and the second high impedance signal has the second level, the plurality of second stages of the second gate driver may perform a masking operation, which converts the clock signal applied to the plurality of second stages into a low power supply voltage. When the first high impedance signal has the second level and the second high impedance signal has the first level, the plurality of first stages of the first gate driver may perform a masking operation, which converts the clock signal applied to the plurality of first stages into the low power supply voltage.

In embodiments, the buffer circuit may include a first P-type metal-oxide-semiconductor (PMOS) transistor configured to output a high gate voltage as the gate signal at the gate output node in response to a voltage of a first control node, a first N-type metal-oxide-semiconductor (NMOS) transistor configured to output a low gate voltage as the gate signal at the gate output node in response to a voltage of a second control node, a second PMOS transistor configured to transfer the high gate voltage to the first control node in response to an inverted high impedance signal, and a second NMOS transistor configured to transfer the low gate voltage to the second control node in response to the high impedance signal.

In embodiments, the buffer circuit may further include a first inverter configured to generate an inverted gate signal by inverting the gate signal, a first transmission gate configured to transfer the inverted gate signal to the first control node in response to the high impedance signal and the inverted high impedance signal, and a second transmission gate configured to transfer the inverted gate signal to the second control node in response to the high impedance signal and the inverted high impedance signal.

In embodiments, the buffer circuit may include a plurality of inverters connected in series, and configured to buffer the gate signal, and a transmission gate configured to transfer the gate signal output from the plurality of inverters to the gate output node in response to the high impedance signal and an inverted high impedance signal.

According to embodiments, there is provided an electronic device including a processor configured to provide input image data, and a display device configured to receive the input image data from the processor, and to display an image based on the input image data. The display device includes a display panel including a plurality of write lines, a plurality of compensation lines, a plurality of first initialization lines, a plurality of second initialization lines, a plurality of anode initialization lines, a plurality of emission lines and a plurality of pixels, a data driver configured to provide data signals to the plurality of pixels, left and right write drivers arranged on left and right sides of the plurality of pixels, respectively, and configured to provide write signals to the plurality of pixels through the plurality of write lines, left and right compensation drivers arranged on the left and right sides of the plurality of pixels, respectively, and configured to provide compensation signals to the plurality of pixels through the plurality of compensation lines, left and right first initialization drivers arranged on the left and right sides of the plurality of pixels, respectively, and configured to provide first initialization signals to the plurality of pixels through the plurality of first initialization lines, left and right second initialization drivers arranged on the left and right sides of the plurality of pixels, respectively, and configured to provide second initialization signals to the plurality of pixels through the plurality of second initialization lines, left and right anode initialization drivers arranged on the left and right sides of the plurality of pixels, respectively, and configured to provide anode initialization signals to the plurality of pixels through the plurality of anode initialization lines, left and right emission drivers arranged on the left and right sides of the plurality of pixels, respectively, and configured to provide emission signals to the plurality of pixels through the plurality of emission lines, and a controller configured to provide the same clock signal to the left and right write drivers, the left and right compensation drivers, the left and right first initialization drivers, the left and right second initialization drivers, the left and right anode initialization drivers, and the left and right emission drivers, to provide left and right write high impedance signals to the left and right write drivers, respectively, to provide left and right compensation high impedance signals to the left and right compensation drivers, respectively, to provide left and right first initialization high impedance signals to the left and right first initialization drivers, respectively, to provide left and right second initialization high impedance signals to the left and right second initialization drivers, respectively, to provide left and right anode initialization high impedance signals to the left and right anode initialization drivers, respectively, and to provide left and right emission high impedance signals to the left and right emission drivers, respectively. Each of the left and right write drivers, the left and right compensation drivers, the left and right first initialization drivers, the left and right second initialization drivers, the left and right anode initialization drivers, and the left and right emission drivers includes a plurality of stages. At least one stage of the plurality of stages includes a logic circuit configured to generate an intermediate carry signal and a carry output signal by sampling a carry input signal based on the clock signal, and to generate an intermediate gate signal by performing a logic operation on the output enable signal, the intermediate carry signal and the carry output signal, a level shifting circuit configured to generate a gate signal corresponding to one of the write signals, the compensation signals, the first initialization signals, the second initialization signals, the anode initialization signals and the emission signals by shifting a voltage level of the intermediate gate signal, and a buffer circuit configured to output the gate signal at a gate output node when a high impedance signal corresponding to one of the left and right write high impedance signals, the left and right compensation high impedance signals, the left and right first initialization high impedance signals, the left and right second initialization high impedance signals, the left and right anode initialization high impedance signals, and the left and right emission high impedance signals has a first level, and to float the gate output node when the high impedance signal has a second level.

In embodiments, the left and right write drivers may be selectively activated in response to the left and right write high impedance signals, respectively, the left and right compensation drivers may be selectively activated in response to the left and right compensation high impedance signals, respectively, the left and right first initialization drivers may be selectively activated in response to the left and right first initialization high impedance signals, respectively, the left and right second initialization drivers may be selectively activated in response to the left and right second initialization high impedance signals, respectively, the left and right anode initialization drivers may be selectively activated in response to the left and right anode initialization high impedance signals, respectively, and the left and right emission drivers may be selectively activated in response to the left and right emission high impedance signals, respectively.

In embodiments, wherein each of the plurality of pixels may include a capacitor including a first electrode and a second electrode, a first pixel transistor configured to generate a driving current based on a voltage of the second electrode of the capacitor, a second pixel transistor configured to transfer a corresponding one of the data signals to the first electrode of the capacitor in response to a corresponding one of the write signals, a third pixel transistor configured to diode-connect the first pixel transistor in response to a corresponding one of the compensation signals, a fourth pixel transistor configured to provide the driving current to a light-emitting element in response to a corresponding one of the emission signals, a fifth pixel transistor configured to provide an initialization voltage to an anode of the light-emitting element in response to a corresponding one of the anode initialization signals, a sixth pixel transistor configured to provide a pre-charge voltage to the first electrode of the capacitor in response to a corresponding one of the first initialization signals, a seventh pixel transistor configured to provide the pre-charge voltage to the second electrode of the capacitor in response to a corresponding one of the second initialization signals, and the light-emitting element configured to emit light based on the driving current generated by the first pixel transistor.

As described above, in a gate driver according to embodiments, a buffer circuit of a stage may output a gate signal at a gate output node of the stage when a high impedance signal has a first level, and may float the gate output node when the high impedance signal has a second level. Accordingly, the gate driver according to embodiments may be selectively activated in response to the high impedance signal.

Further, a display device according to embodiments may include first and second gate drivers arranged on opposite sides (e.g., left and right sides) of a display panel, and the first and second gate drivers may be selectively activated in response to first and second high impedance signals, respectively. Accordingly, even if the display device is not redesigned, the display device according to embodiments may selectively perform a double-side driving operation that provides gate signals on the opposite sides of the display panel or a single-side driving operation that provides the gate signals on one side of the display panel.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
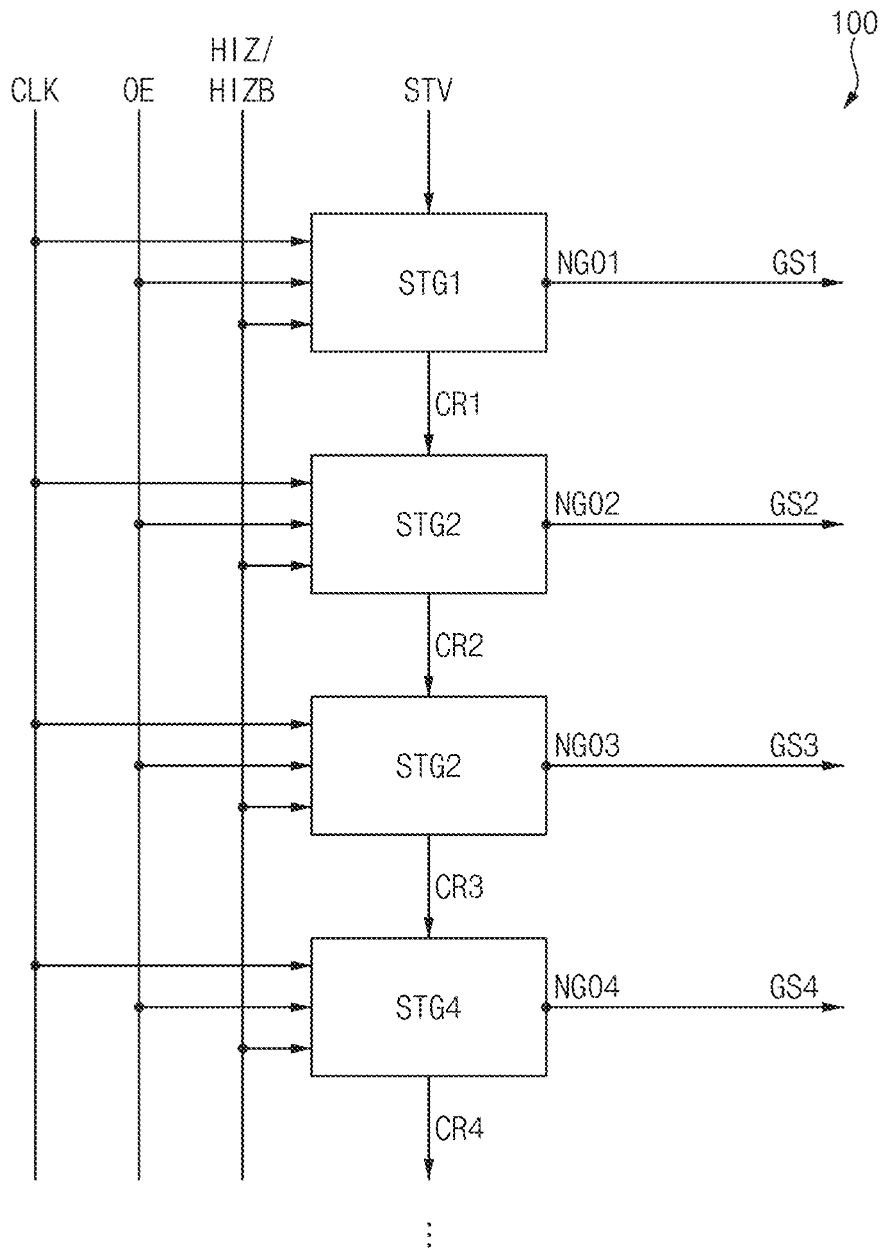
FIG. 1 is a block diagram illustrating a gate driver according to embodiments.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The embodiments are described more fully hereinafter with reference to the accompanying drawings. Like or similar reference numerals refer to like or similar elements throughout.

Figure 2:
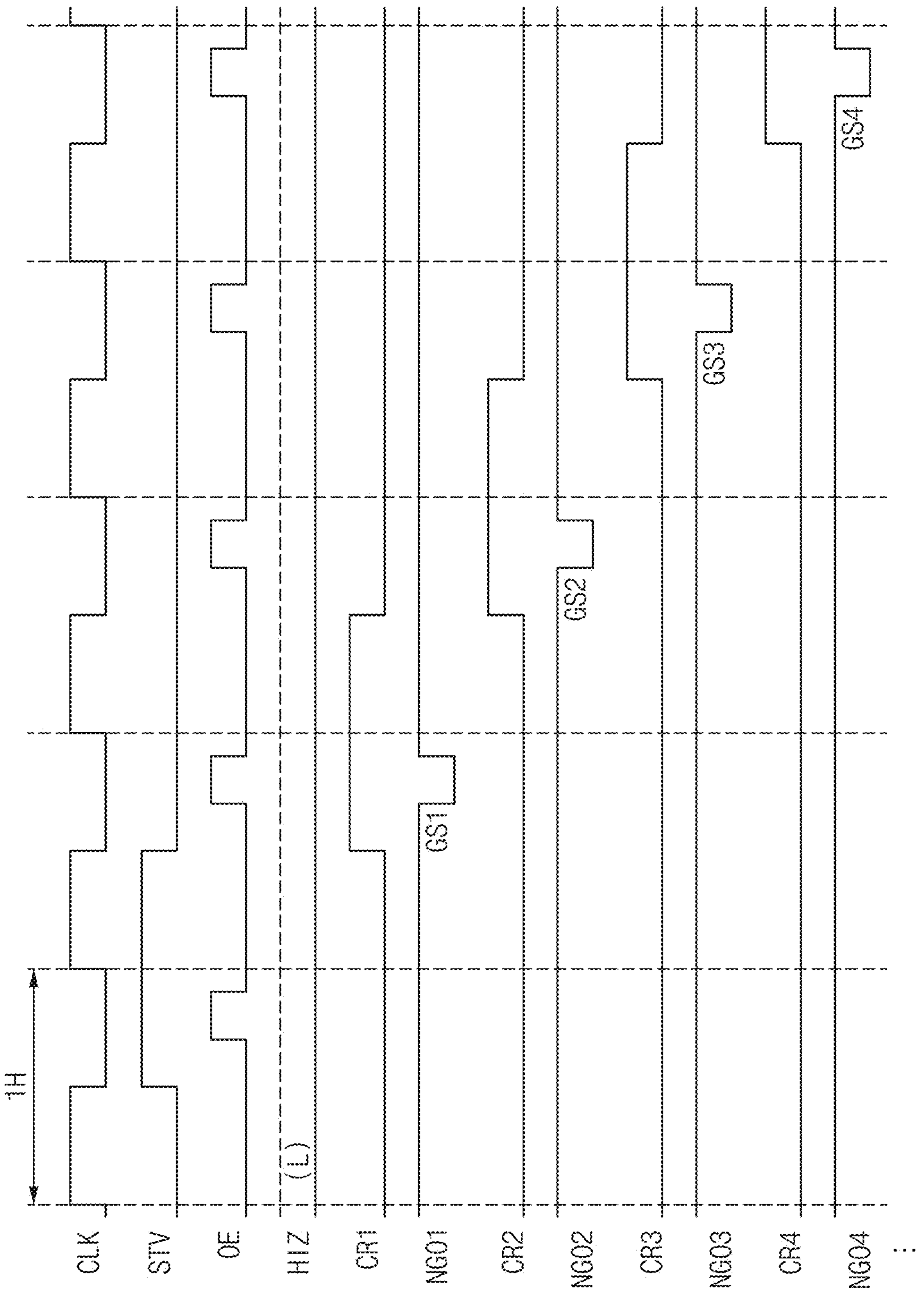
FIG. 2 is a timing diagram for describing an example of an operation of a gate driver of FIG. 1 when a high impedance signal has a first level.
Figure 3:
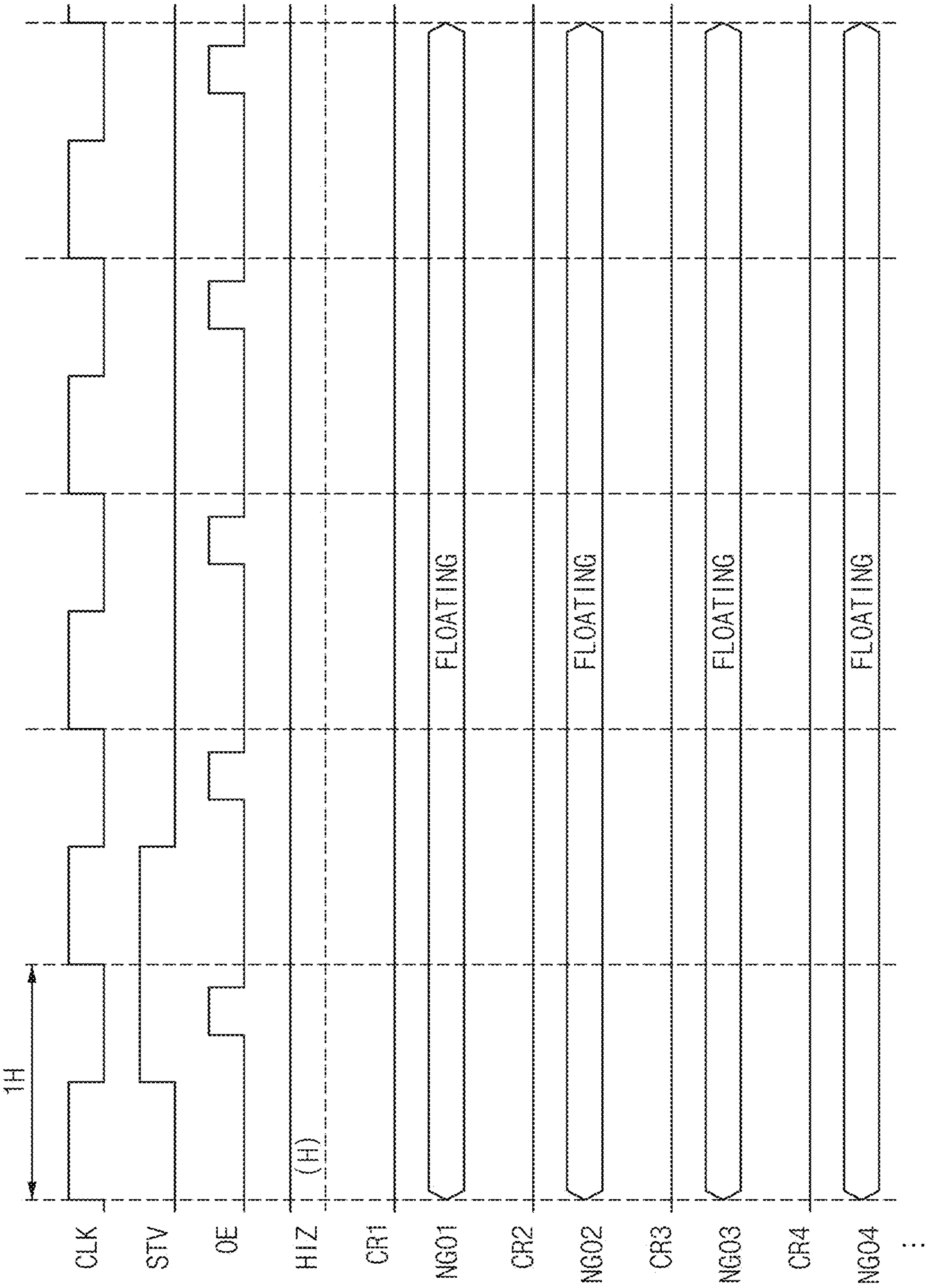
FIG. 3 is a timing diagram for describing an example of an operation of a gate driver of FIG. 1 when a high impedance signal has a second level.

FIG. 1 is a block diagram illustrating a gate driver according to embodiments, FIG. 2 is a timing diagram for describing an example of an operation of a gate driver of FIG. 1 when a high impedance signal has a first level, and FIG. 3 is a timing diagram for describing an example of an operation of a gate driver of FIG. 1 when a high impedance signal has a second level.

Referring to FIG. 1, a gate driver 100 according to embodiments may include a plurality of stages STG1, STG2, STG3, STG4, etc. The gate driver 100 may be implemented in the form of a shift register in which the plurality of stages STG1, STG2, STG3, STG4, etc. sequentially outputs gate signals GS1, GS2, GS3, GS4, etc. According to embodiments, the gate driver 100 may be a scan driver or an emission driver included in a display device. For example, the gate driver 100 may be a write driver that sequentially provides write signals to a plurality of pixels, a compensation driver that sequentially provides compensation signals to the plurality of pixels, a first initialization driver that sequentially provides first initialization signals to the plurality of pixels, a second initialization driver that sequentially provides second initialization signals to the plurality of pixels, an anode initialization driver that sequentially provides anode initialization signals to the plurality of pixels, or an emission driver that sequentially provides emission signals to the plurality of pixels.

The plurality of stages STG1, STG2, STG3, STG4, etc. may sequentially output carry output signals CR1, CR2, CR3, CR4, etc. and the gate signals GS1, GS2, GS3, GS4, etc. based on a start signal STV, a clock signal CLK, an output enable signal OE and a high impedance signal HIZ (and/or an inverted high impedance signal HIZB). Further, a first stage STG1 may receive the start signal STV as a carry input signal, and each of the subsequent stages STG2, STG3, STG4, etc. may receive a carry output signal of a previous stage as a carry input signal. The gate driver 100 may be selectively activated or enabled in response to the high impedance signal HIZ and/or the inverted high impedance signal HIZB. In some embodiments, when the high impedance signal HIZ has a first level (e.g., a low level L), the plurality of stages STG1, STG2, STG3, STG4, etc. may sequentially output the carry output signals CR1, CR2, CR3, CR4, etc. and the gate signals GS1, GS2, GS3, GS4, etc. When the high impedance signal HIZ has a second level (e.g., a high level H), the plurality of stages STG1, STG2, STG3, STG4, etc. may not output the carry output signals CR1, CR2, CR3, CR4, etc. and the gate signals GS1, GS2, GS3, GS4, etc., and may float gate output nodes NGO1, NGO2, NGO3, NGO4, etc. of the plurality of stages STG1, STG2, STG3, STG4, etc.

For example, as illustrated in FIG. 2, when the high impedance signal HIZ has the low level L, the first stage STG1 may output a first carry output signal CR1 by shifting or delaying the start signal STV by a period of the clock signal CLK. In some embodiments, the period of the clock signal CLK may correspond to, but is not limited to, one horizontal time 1H. Here, one horizontal time 1H may be a time allocated to one pixel row of a display panel, and may correspond to a time obtained by dividing a frame time by the number of pixel rows of the display panel. Further, the first stage STG1 may perform a logic operation (e.g., a NAND operation) on the first carry output signal CR1 and the output enable signal OE to generate a first gate signal GS1, and output the first gate signal GS1 at a first gate output node NGO1. The second stage STG2 may output a second carry output signal CR2 by shifting or delaying the first carry output signal CR1 by the period of the clock signal CLK, and may output a second gate signal GS2 at a second gate output node NGO2 based on the second carry output signal CR2 and the output enable signal OE. The third stage STG3 may output a third carry output signal CR3 by shifting or delaying the second carry output signal CR2 by the period of the clock signal CLK, and may output a third gate signal GS3 at a third gate output node NGO3 based on the third carry output signal CR3 and the output enable signal OE. The fourth stage STG4 may output a fourth carry output signal CR4 by shifting or delaying the third carry output signal CR3 by the period of the clock signal CLK, and may output a fourth gate signal GS4 at a fourth gate output node NGO4 based on the fourth carry output signal CR4 and the output enable signal OE. In this manner, the plurality of stages STG1, STG2, STG3, STG4, etc. may sequentially output the carry output signals CR1, CR2, CR3, CR4, etc. and the gate signals GS1, GS2, GS3, GS4, etc.

In another example, as illustrated in FIG. 3, when the high impedance signal HIZ has the high level H, even if the start signal STV, the clock signal CLK and the output enable signal OE are applied to the plurality of stages STG1, STG2, STG3, STG4, etc., the plurality of stages STG1, STG2, STG3, STG4, etc. may not output the carry output signals CR1, CR2, CR3, CR4, etc. and the gate signals GS1, GS2, GS3, GS4, etc. Further, the plurality of stages STG1, STG2, STG3, STG4, etc. may float the gate output nodes NGO1, NGO2, NGO3, NGO4, etc. such that loads of gate lines connected to the gate output nodes NGO1, NGO2, NGO3, NGO4, etc. are not increased. In some embodiments, even if a clock signal CLK and/or an output enable signal OE that periodically toggle between a high power supply voltage VDD and a low power supply voltage VSS (See FIG. 4) are applied to the plurality of stages STG1, STG2, STG3, STG4, etc., the plurality of stages STG1, STG2, STG3, STG4, etc. may perform a masking operation that converts the clock signal CLK and/or the output enable signal OE applied to the plurality of stages STG1, STG2, STG3, STG4, etc. into the low power supply voltage VSS. Accordingly, internal circuits (e.g., logic circuits) of the plurality of stages STG1, STG2, STG3, STG4, etc. may not operate in response to the clock signal CLK that is converted or fixed to the low power supply voltage VSS, and power consumption of the gate driver 100 may be reduced.

As described above, the gate driver 100 according to embodiments may be selectively activated or enabled in response to the high impedance signal HIZ. Accordingly, as described below with reference to FIG. 10, even if a display device including the gate drivers 100 arranged on opposite sides (e.g., left and right sides) of the display panel, respectively, is not redesigned, the display device may selectively perform a double-side driving operation or a single-side driving operation by selectively activating each of the gate drivers 100.

Figure 4:
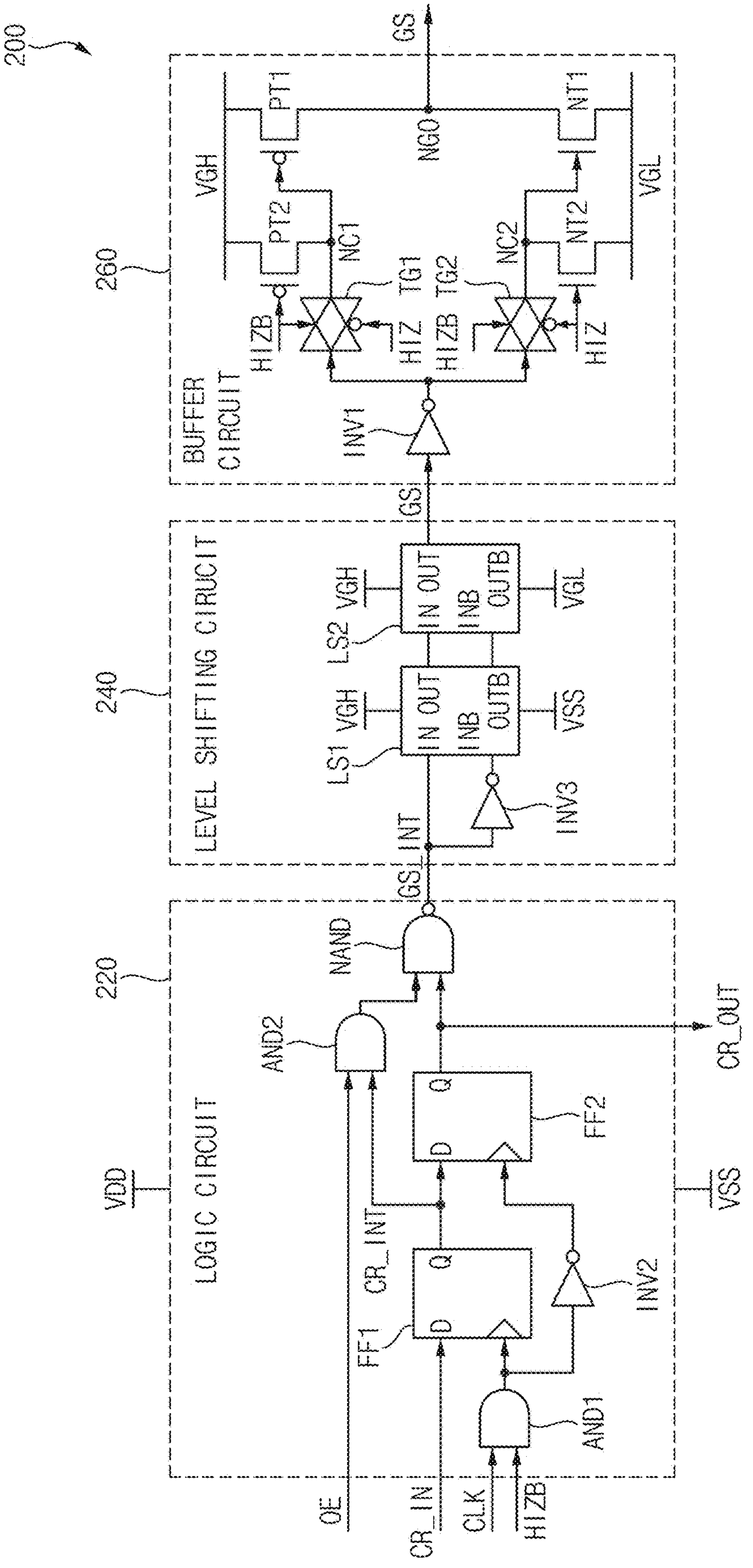
FIG. 4 is a circuit diagram illustrating a stage of a gate driver according to embodiments.
Figure 5:
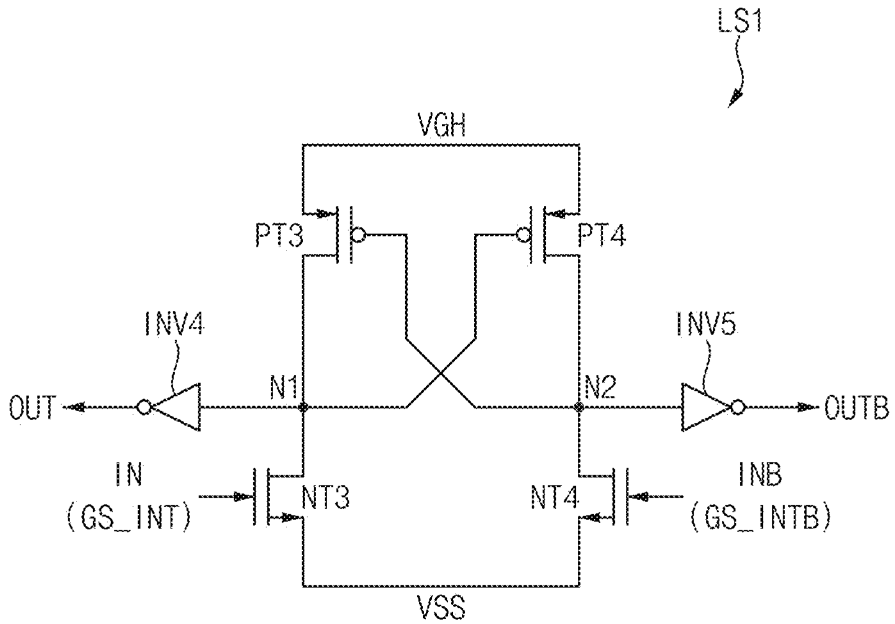
FIG. 5 is a circuit diagram illustrating an example of a first level shifter included in a stage of FIG. 4.
Figure 6:
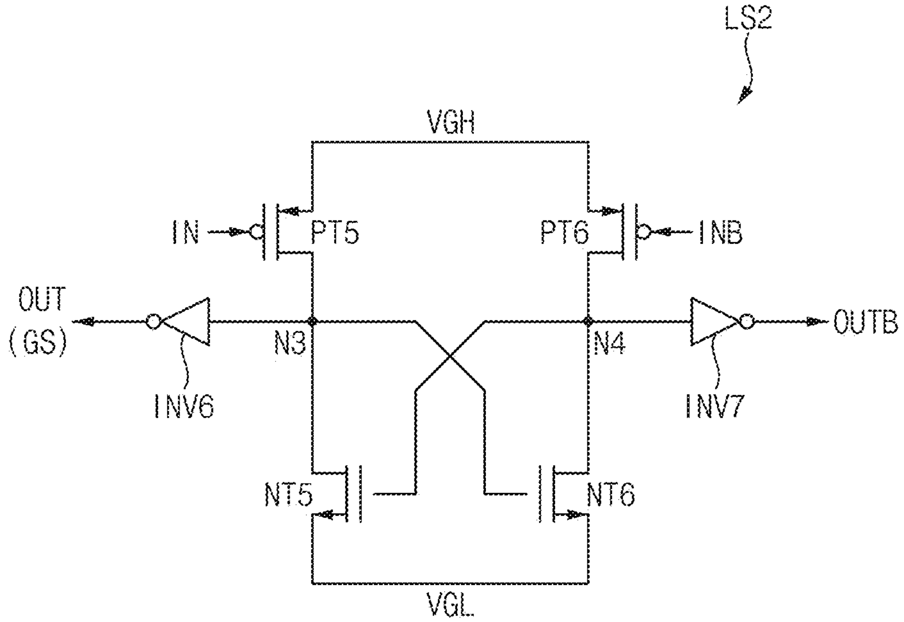
FIG. 6 is a circuit diagram illustrating an example of a second level shifter included in a stage of FIG. 4.

FIG. 4 is a circuit diagram illustrating a stage of a gate driver according to embodiments, FIG. 5 is a circuit diagram illustrating an example of a first level shifter included in a stage of FIG. 4, and FIG. 6 is a circuit diagram illustrating an example of a second level shifter included in a stage of FIG. 4.

Referring to FIG. 4, a stage 200 of a gate driver according to embodiments may include a logic circuit 220, a level shifting circuit 240 and a buffer circuit 260.

The logic circuit 220 may generate an intermediate carry signal CR_INT and a carry output signal CR_OUT by sampling a carry input signal CR_IN based on a clock signal CLK. In some embodiments, the carry input signal CR_IN may be the start signal STV illustrated in FIG. 1 in a case where the stage 200 is a first stage of the gate driver, and may be a carry output signal of a previous stage in a case where the stage 200 is one of subsequent stages of the gate driver. Further, the logic circuit 220 may generate an intermediate gate signal GS_INT by performing a logic operation on an output enable signal OE, the intermediate carry signal CR_INT and the carry output signal CR_OUT. To perform these operations, in some embodiments, the logic circuit 220 may include a first AND gate AND1, a first flip-flop FF1, a second inverter INV2, a second flip-flop FF2, a second AND gate AND2 and a NAND gate NAND.

The first AND gate AND1 may receive the clock signal CLK that periodically toggles between a high power supply voltage VDD and a low power supply voltage VSS, and may perform a masking operation that converts the clock signal CLK into the low power supply voltage VSS while a high impedance signal HIZ has a second level (e.g., a high level H) or while an inverted high impedance signal HIZB has a first level (e.g., a low level L). Accordingly, when the gate driver is deactivated in response to the high impedance signal HIZ having the second level (e.g., the high level H), the clock signal CLK may be masked or fixed to the low power supply voltage VSS, thereby reducing power consumption of the logic circuit 220 of each stage 200 and reducing power consumption of the gate driver. In some embodiments, the first AND gate AND1 may include a first input terminal which receives the clock signal CLK, a second input terminal which receives the inverted high impedance signal HIZB, and an output terminal. Further, the first AND gate AND1 may perform an AND operation on the clock signal CLK and the inverted high impedance signal HIZB. Thus, the first AND gate AND1 may output the clock signal CLK that periodically toggles at the output terminal when the inverted high impedance signal HIZB has the high level, and may output the clock signal CLK masked or fixed to the low power supply voltage VSS at the output terminal when the inverted high impedance signal HIZB has the low level.

The first flip-flop FF1 may output the intermediate carry signal CR_INT by sampling the carry input signal CR_IN in response to an output signal of the first AND gate AND1. In some embodiments, the first flip-flop FF1 may include a data input terminal D which receives the carry input signal CR_IN, a data output terminal Q which outputs the intermediate carry signal CR_INT, and a clock terminal which receives the output signal of the first AND gate AND1. Further, the first flip-flop FF1 may output the intermediate carry signal CR_INT by sampling the carry input signal CR_IN at a rising edge of the output signal of the first AND gate AND1. Thus, the first flip-flop FF1 may output the intermediate carry signal CR_INT that is delayed or shifted by half a period of the clock signal CLK from the carry input signal CR_IN when the inverted high impedance signal HIZB has the high level, and may not operate when the inverted high impedance signal HIZB has the low level.

The second inverter INV2 may invert the output signal of the first AND gate AND1, and the second flip-flop FF2 may output the carry output signal CR_OUT by sampling the intermediate carry signal CR_INT in response to an output signal of the second inverter INV2. In some embodiments, the second flip-flop FF2 may include a data input terminal D which receives the intermediate carry signal CR_INT, a data output terminal Q which outputs the carry output signal CR_OUT, and a clock terminal which receives the output signal of the second inverter INV2. Further, the second flip-flop FF2 may output the carry output signal CR_OUT by sampling the intermediate carry signal CR_INT at a rising edge of the output signal of the second inverter INV2. Thus, the second flip-flop FF2 may output the carry output signal CR_OUT that is delayed or shifted by half the period of the clock signal CLK from the intermediate carry signal CR_INT when the inverted high impedance signal HIZB has the high level, and may not operate when the inverted high impedance signal HIZB has the low level. Accordingly, the logic circuit 220 may output the carry output signal CR_OUT by delaying or shifting the carry input signal CR_IN by the period of the clock signal CLK.

The second AND gate AND2 may include a first input terminal which receives the output enable signal OE, a second input terminal which receives the intermediate carry signal CR_INT, and an output terminal. Further, the second AND gate AND2 may perform an AND operation on the output enable signal OE and the intermediate carry signal CR_INT. Thus, the second AND gate AND2 may output an output signal having a low level at the output terminal when the output enable signal OE or the intermediate carry signal CR_INT has a low level, and may output the output signal having a high level at the output terminal when both the output enable signal OE and the intermediate carry signal CR_INT have a high level.

The NAND gate NAND may include a first input terminal which receives the output signal of the second AND gate AND2, a second input terminal which receives the carry output signal CR_OUT, and an output terminal. Further, the NAND gate NAND may generate the intermediate gate signal GS_INT by performing a NAND operation on the output signal of the second AND gate AND2 and the carry output signal CR_OUT. Thus, the NAND gate NAND may output the intermediate gate signal GS_INT having a high level at the output terminal when the output signal of the second AND gate AND2 or the carry output signal CR_OUT has a low level, and may output the intermediate gate signal GS_INT having a low level at the output terminal when both the output signal of the second AND gate AND2 and the carry output signal CR_OUT have a high level. Accordingly, the logic circuit 220 may output the intermediate gate signal GS_INT having the low level when all of the output enable signal OE, the intermediate carry signal CR_INT and the carry output signal CR_OUT have the high level.

The level shifting circuit 240 may generate the gate signal GS by shifting a voltage level of the intermediate gate signal GS_INT. In some embodiments, the intermediate gate signal GS_INT may have a high power supply voltage VDD or a low power supply voltage VSS, and the level shifting circuit 240 may generating the gate signal GS having a high gate voltage VGH or a low gate voltage VGL by changing the high power supply voltage VDD of the intermediate gate signal GS_INT to the high gate voltage VGH and by changing the low power supply voltage VSS of the intermediate gate signal GS_INT to the low gate voltage VGL. For example, a voltage difference between the high power supply voltage VDD and the low power supply voltage VSS may be less than a voltage difference between the high gate voltage VGH and the low gate voltage VGL. Accordingly, the logic circuit 220 may operate based on the high power supply voltage VDD and the low power supply voltage VSS, and thus the power consumption of the logic circuit 220 may be reduced. In some embodiments, the level shifting circuit 240 may include a third inverter INV3, a first level shifter LS1 and a second level shifter LS2.

The third inverter INV3 may generate an inverted intermediate gate signal by inverting the intermediate gate signal GS_INT. When the intermediate gate signal GS_INT has the high power supply voltage VDD, the first level shifter LS1 may convert the high power supply voltage VDD of the intermediate gate signal GS_INT into the high gate voltage VGH. In some embodiments, the first level shifter LS1 may include an input terminal IN which receives the intermediate gate signal GS_INT having the high power supply voltage VDD or the low power supply voltage VSS, an inverted input terminal INB which receives the inverted intermediate gate signal having the low power supply voltage VSS or the high power supply voltage VDD, an output terminal OUT which outputs the intermediate gate signal GS_INT having the high gate voltage VGH or the low power supply voltage VSS, and an inverted output terminal OUTB which outputs the inverted intermediate gate signal having the low power supply voltage VSS or the high gate voltage VGH.

In some embodiments, as illustrated in FIG. 5, the first level shifter LS1 may include a third N-type metal-oxide-semiconductor ("NMOS") transistor NT3 that transfers the low power supply voltage VSS to a first node N1 in response to the intermediate gate signal GS_INT, a fourth NMOS transistor NT4 that transfers the low power supply voltage VSS to a second node N2 in response to an inverted intermediate gate signal GS_INTB, a third P-type metal-oxide-semiconductor ("PMOS") transistor PT3 that transfers the high gate voltage VGH to the first node N1 in response to a voltage of the second node N2, a fourth PMOS transistor PT4 that transfers the high gate voltage VGH to the second node N2 in response to a voltage of the first node N1, a fourth inverter INV4 that inverts the voltage of the first node N1, and a fifth inverter INV5 that inverts the voltage of the second node N2. In some embodiments, the third NMOS transistor NT3 may include a gate which receives the intermediate gate signal GS_INT, a first terminal which receives the low power supply voltage VSS, and a second terminal connected to the first node N1, the fourth NMOS transistor NT4 may include a gate which receives the inverted intermediate gate signal GS_INTB, a first terminal which receives the low power supply voltage VSS, and a second terminal connected to the second node N2, the third PMOS transistor PT3 may include a gate connected to the second node N2, a first terminal which receives the high gate voltage VGH, and a second terminal connected to the first node N1, and the fourth PMOS transistor PT4 may include a gate connected to the first node N1, a first terminal which receives the high gate voltage VGH, and a second terminal connected to the second node N2.

When the intermediate gate signal GS_INT has the high power supply voltage VDD and the inverted intermediate gate signal GS_INTB has the low power supply voltage VSS, the third NMOS transistor NT3 may be turned on to apply the low power supply voltage VSS to the first node N1, the fourth PMOS transistor PT4 may be turned on to apply the high gate voltage VGH to the second node N2. Further, the fourth NMOS transistor NT4 and the third PMOS transistor PT3 may be turned off. The fourth inverter INV4 may output the high gate voltage VGH at the output terminal OUT by inverting the low power supply voltage VSS of the first node N1, and the fifth inverter INV5 may output a low power supply voltage VSS at the inverted output terminal OUTB by inverting the high gate voltage VGH of the second node N2. When the intermediate gate signal GS_INT has the low power supply voltage VSS and the inverted intermediate gate signal GS_INTB has the high power supply voltage VDD, the fourth NMOS transistor NT4 may be turned on to apply the low power supply voltage VSS to the second node N2, and the third PMOS transistor PT3 may be turned on to apply the high gate voltage VGH to the first node N1. Further, the third NMOS transistor NT3 and the fourth PMOS transistor PT4 may be turned off. The fourth inverter INV4 may output the low power supply voltage VSS at the output terminal OUT by inverting the high gate voltage VGH of the first node N1, and the fifth inverter INV5 may output the high gate voltage VGH at the inverted output terminal OUTB by inverting the low power supply voltage VSS of the second node N2. Accordingly, the first level shifter LS1 may output the intermediate gate signal GS_INT having the high gate voltage VGH or the low power supply voltage VSS by performing a level shifting operation for the intermediate gate signal GS_INT having the high power supply voltage VDD or the low power supply voltage VSS.

The second level shifter LS2 may convert the low power supply voltage VSS of the intermediate gate signal GS_INT into the low gate voltage VGL when the intermediate gate signal GS_INT has the low power supply voltage VSS, and may output the gate signal GS having the high gate voltage VGH or the low gate voltage VGL. In some embodiments, the second level shifter LS2 may include an input terminal IN which receives the intermediate gate signal GS_INT having the high gate voltage VGH or the low power supply voltage VSS, an inverted input terminal INB which receives the inverted intermediate gate signal GS_INTB having the low power supply voltage VSS or the high gate voltage VGH, an output terminal OUT which outputs the gate signal GS having the high gate voltage VGH or the low gate voltage VGL, and an inverted output terminal OUTB.

In some embodiments, as illustrated in FIG. 6, the second level shifter LS2 may include a fifth PMOS transistor PT5 that transfers the high gate voltage VGH to a third node N3 in response to an output signal of the fourth inverter INV4, a sixth PMOS transistor PT6 that transfers the high gate voltage VGH to a fourth node N4 in response to an output signal of the fifth inverter INV5, a fifth NMOS transistor NT5 that transfers the low gate voltage VGL to the third node N3 in response to a voltage of the fourth node N4, a sixth NMOS transistor NT6 that transfers the low gate voltage VGL to the fourth node N4 in response to a voltage of the third node N3, a sixth inverter INV6 that inverts the voltage of the third node N3 to generate the gate signal GS having the high gate voltage VGH or the low gate voltage VGL, and a seventh inverter INV7 that inverts the voltage of the fourth node N4. In some embodiments, the fifth PMOS transistor PT5 may include a gate connected to the fourth inverter INV4, a first terminal which receives the high gate voltage VGH, and a second terminal connected to the third node N3, the sixth PMOS transistor PT6 may include a gate connected to the fifth inverter INV5, a first terminal which receives the high gate voltage VGH, and a second terminal connected to the fourth node N4, the fifth NMOS transistor NT5 may include a gate connected to the fourth node N4, a first terminal which receives the low gate voltage VGL, and a second terminal connected to the third node N3, and the sixth NMOS transistor NT6 may include a gate connected to the third node N3, a first terminal which receives the low gate voltage VGL, and a second terminal connected to the fourth node N4.

When the intermediate gate signal GS_INT output from the first level shifter LS1 has the high gate voltage VGH and the inverted intermediate gate signal GS_INTB output from the first level shifter LS1 has the low power supply voltage VSS, the sixth PMOS transistor PT6 may be turned on to apply the high gate voltage VGH to the fourth node N4, and the fifth NMOS transistor NT5 may be turned on to apply the low gate voltage VGL to the third node N3. Further, the fifth PMOS transistor PT5 and the sixth NMOS transistor NT6 may be turned off. The sixth inverter INV6 may output the high gate voltage VGH at the output terminal OUT by inverting the low gate voltage VGL of the third node N3, and the seventh inverter INV7 may output the low gate voltage VGL at the inverted output terminal OUTB by inverting the high gate voltage VGH of the fourth node N4. When the intermediate gate signal GS_INT output from the first level shifter LS1 has the low power supply voltage VSS and the inverted intermediate gate signal GS_INTB output from the first level shifter LS1 has the high gate voltage VGH, the fifth PMOS transistor PT5 may be turned on to apply the high gate voltage VGH to the third node N3, and the sixth NMOS transistor NT6 may be turned on to apply the low gate voltage VGL to the fourth node N4. Further, the sixth PMOS transistor PT6 and the fifth NMOS transistor NT5 may be turned off. The sixth inverter INV6 may output the low gate voltage VGL at the output terminal OUT by inverting the high gate voltage VGH of the third node N3, and the seventh inverter INV7 may output the high gate voltage VGH at the inverted output terminal OUTB by inverting the low gate voltage VGL of the fourth node N4. Thus, the second level shifter LS2 may output the gate signal GS having the high gate voltage VGH or the low gate voltage VGL by performing a level shifting operation for the intermediate gate signal GS_INT having the high gate voltage VGH or the low power supply voltage VSS. Accordingly, the level shifting circuit 240 may output the gate signal GS having the high gate voltage VGH or the low gate voltage VGL.

The buffer circuit 260 may output the gate signal GS at a gate output node NGO when the high impedance signal HIZ has a first level (e.g., a low level L) or when the inverted high impedance signal HIZB has a second level (e.g., a high level H), and may float the gate output node NGO when the high impedance signal HIZ has the second level or when the inverted high impedance signal HIZB has the first level. To perform these operations, in some embodiments, the buffer circuit 260 may include a first inverter INV1, a first transmission gate TG1, a second transmission gate TG2, a first PMOS transistor PT1, a first NMOS transistor NT1, a second PMOS transistor PT2 and a second NMOS transistor NT2.

The first inverter INV1 may generate an inverted gate signal by inverting the gate signal GS. The first transmission gate TG1 may transfer the inverted gate signal to a first control node NC1 in response to the high impedance signal HIZ and the inverted high impedance signal HIZB, and the second transmission gate TG2 may transfer the inverted gate signal to a second control node NC2 in response to the high impedance signal HIZ and the inverted high impedance signal HIZB. For example, when the high impedance signal HIZ has the first level (e.g., the low level) or when the inverted high impedance signal HIZB has the second level (e.g., the high level), the first and second transmission gates TG1 and TG2 may transfer the inverted gate signal to the first and second control nodes NC1 and NC2. However, when the high impedance signal HIZ has the second level and the inverted high impedance signal HIZB has the first level, the first and second transmission gates TG1 and TG2 may not transfer the inverted gate signal to the first and second control nodes NC1 and NC2.

The first PMOS transistor PT1 may output the high gate voltage VGH as the gate signal GS at the gate output node NGO in response to the voltage of the first control node NC1, the first NMOS transistor NT1 may output the low gate voltage VGL as the gate signal GS at the gate output node NGO in response to the voltage of the second control node NC2, the second PMOS transistor PT2 may transfer the high gate voltage VGH to the first control node NC1 in response to the inverted high impedance signal HIZB, and the second NMOS transistor NT2 may transfer the low gate voltage VGL to the second control node NC2 in response to the high impedance signal HIZ. In some embodiments, the first PMOS transistor PT1 may include a gate connected to the first control node NC1, a first terminal which receives the high gate voltage VGH, and a second terminal connected to the gate output node NGO, the first NMOS transistor NT1 may include a gate connected to the second control node NC2, a first terminal which receives the low gate voltage VGL, and a second terminal connected to the gate output node NGO, the second PMOS transistor PT2 may include a gate which receives the inverted high impedance signal HIZB, a first terminal which receives the high gate voltage VGH, and a second terminal connected to the first control node NC1, and the second NMOS transistor NT2 may include a gate which receives the high impedance signal HIZ, a first terminal which receives the low gate voltage VGL, and a second terminal connected to the second control node NC2.

In a first case where the high impedance signal HIZ has the first level (e.g., the low level) and the inverted high impedance signal HIZB has the second level (e.g., the high level), when the gate signal GS has the high gate voltage VGH, the first inverter INV1 may generate the inverted gate signal having the low gate voltage VGL, the first and second transmission gates TG1 and TG2 may transfer the inverted gate signal having the low gate voltage VGL to the first and second control nodes NC1 and NC2, and the second PMOS transistor PT2 and the second NMOS transistor NT2 may be turned off. Thus, the first and second control nodes NC1 and NC2 may have the low gate voltage VGL. Further, the first NMOS transistor NT1 may be turned off in response to the low gate voltage VGL of the second control node NC2, the first PMOS transistor PT1 may be turned on in response to the low gate voltage VGL of the first control node NC1, and the first PMOS transistor PT1 may output the high gate voltage VGH as the gate signal GS at the gate output node NGO. Further, in the first case, when the gate signal GS has the low gate voltage VGL, the first inverter INV1 may generate the inverted gate signal having the high gate voltage VGH, and the first and second transmission gates TG1 and TG2 may transfer the inverted gate signal having the high gate voltage VGH to the first and second control nodes NC1 and NC2, and the second PMOS transistor PT2 and the second NMOS transistor NT2 may be turned off. Thus, the first and second control nodes NC1 and NC2 may have the high gate voltage VGH. Further, the first PMOS transistor PT1 may be turned off in response to the high gate voltage VGH of the first control node NC1, the first NMOS transistor NT1 may be turned on in response to the high gate voltage VGH of the second control node NC2, and the first NMOS transistor NT1 may output the low gate voltage VGL as the gate signal GS at the gate output node NGO. Accordingly, in the first case where the high impedance signal HIZ has the first level (e.g., the low level) and the inverted high impedance signal HIZB has the second level (e.g., the high level), the buffer circuit 260 may output the gate signal GS at the gate output node NGO.

However, in a second case where the high impedance signal HIZ has the second level (e.g., the high level) and the inverted high impedance signal HIZB has the first level (e.g., the low level), the first and second transmission gates TG1 and TG2 may not transfer the inverted gate signal output from the first inverter INV1 to the first and second control nodes NC1 and NC2. Further, the second PMOS transistor PT2 may transfer the high gate voltage VGH to the first control node NC1 in response to the inverted high impedance signal HIZB having the low level, and the second NMOS transistor NT2 may transfer the low gate voltage VGL to the second control node NC2 in response to the high impedance signal HIZ having the high level. Thus, the first control node NC1 may have the high gate voltage VGH, and the second control node NC2 may have the low gate voltage VGL. The first PMOS transistor PT1 may be turned off in response to the high gate voltage VGH of the first control node NC1, the first NMOS transistor NT1 may be turned off in response to the low gate voltage VGL of the second control node NC2, and the gate output node NGO may be floated. Accordingly, in the second case where the high impedance signal HIZ has the second level (e.g., the high level) and the inverted high impedance signal HIZB has the first level (e.g., the low level), the buffer circuit 260 may not output the gate signal GS, and may float the gate output node NGO such that a load of a gate line connected to the gate output node NGO is not increased.

As described above, in the stage 200 of the gate driver according to embodiments, the buffer circuit 260 may output the gate signal GS at the gate output node NGO when the high impedance signal HIZ has the first level, and may float the gate output node NGO when the high impedance signal HIZ has the second level. Accordingly, the gate driver according to embodiments may be selectively activated in response to the high impedance signal HIZ. Further, in the stage 200 of the gate driver according to embodiments, when the high impedance signal HIZ has the second level, the logic circuit 220 may perform a masking operation that converts the clock signal CLK applied to the stage 200 into the low power supply voltage VSS. Thus, when the gate driver is deactivated, power consumption of the gate driver may be reduced.

Figure 7:
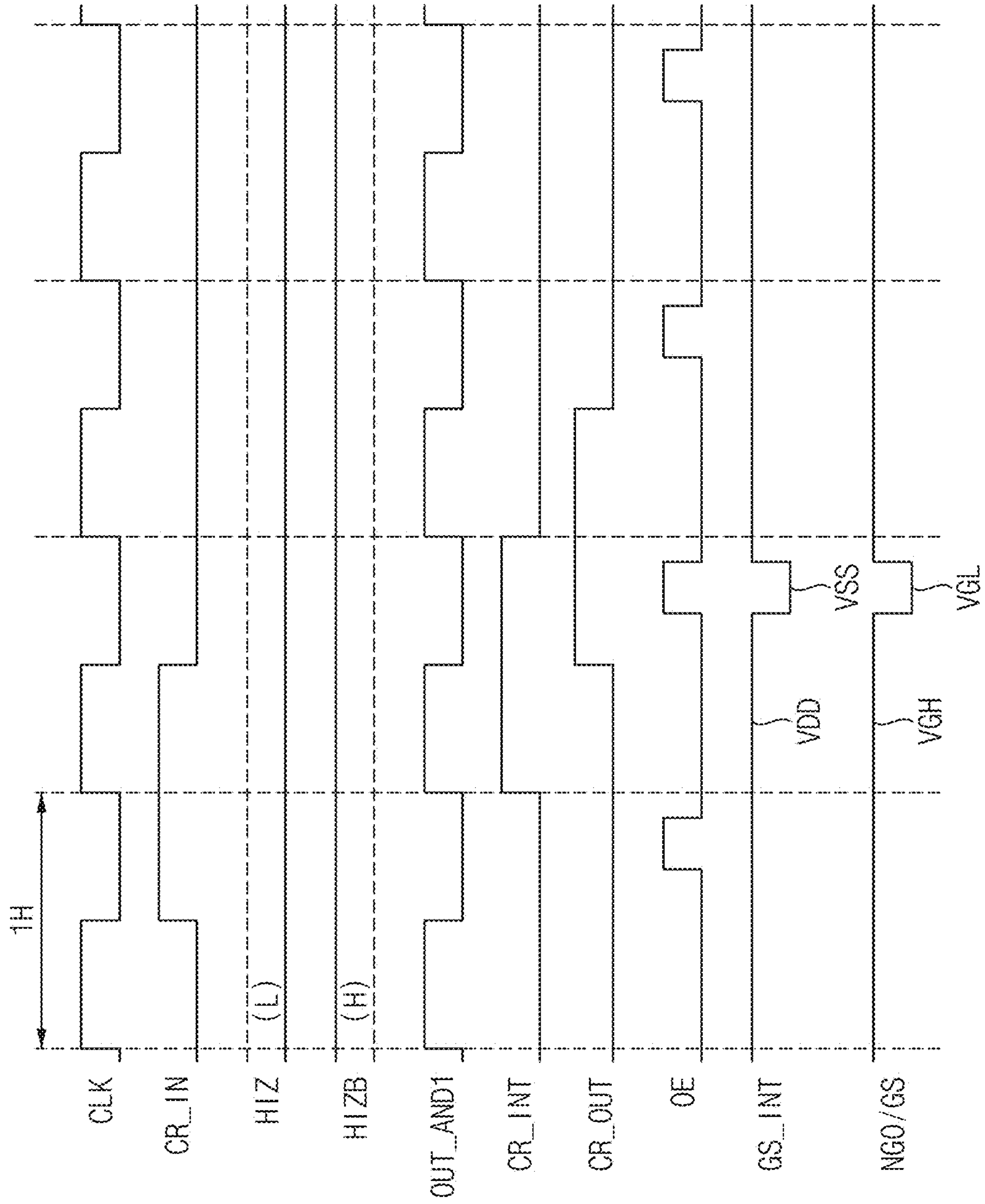
FIG. 7 is a timing diagram for describing an example of an operation of a stage of FIG. 4 when a high impedance signal has a first level.

FIG. 7 is a timing diagram for describing an example of an operation of a stage of FIG. 4 when a high impedance signal has a first level.

Referring to FIGS. 4 and 7, when the high impedance signal HIZ has the low level L and the inverted high impedance signal HIZB has the high level H, the first AND gate AND1 may output an output signal OUT_AND1 that periodically toggles based on the clock signal CLK that periodically toggles and the inverted high impedance signal HIZB that has the high level H. The first flip-flop FF1 may output the intermediate carry signal CR_INT that is delayed or shifted by half the period of the clock signal CLK from the carry input signal CR_IN by sampling the carry input signal CR_IN at a rising edge of the output signal OUT-_AND1 of the first AND gate AND1. The second inverter INV2 may invert the output signal OUT_AND1 of the first AND gate AND1, and the second flip-flop FF2 may output the carry output signal CR_OUT that is delayed or shifted from the carry input signal CR_IN by the period of the clock signal CLK by sampling the intermediate carry signal CR_INT at a rising edge of an output signal of the second inverter INV2. Further, the second AND gate AND2 and the NAND gate NAND may output the intermediate gate signal GS_INT having the high power supply voltage VDD when at least one of the output enable signal OE, the intermediate carry signal CR_INT and the carry output signal CR_OUT has the low level, and may output the intermediate gate signal GS_INT having the low power supply voltage VSS when all of the output enable signal OE, the intermediate carry signal CR_INT and the carry output signal CR_OUT have the high level.

The level shifting circuit 240 may provide the gate signal GS having the high gate voltage VGH or the low gate voltage VGL to the buffer circuit 260 by performing the level shifting operation on the intermediate carry signal CR_INT having the high power supply voltage VDD or the low power supply voltage VSS.

The first and second transmission gates TG1 and TG2 may be turned on in response to the high impedance signal HIZ having the low level L and the inverted high impedance signal HIZB having the high level H, the second PMOS transistor PT2 may be turned off in response to the inverted high impedance signal HIZB having the high level H, and the second NMOS transistor NT2 may be turned off in response to the high impedance signal HIZ having the low level L. Accordingly, the buffer circuit 260 may output the gate signal GS at the gate output node NGO.

Figure 8:
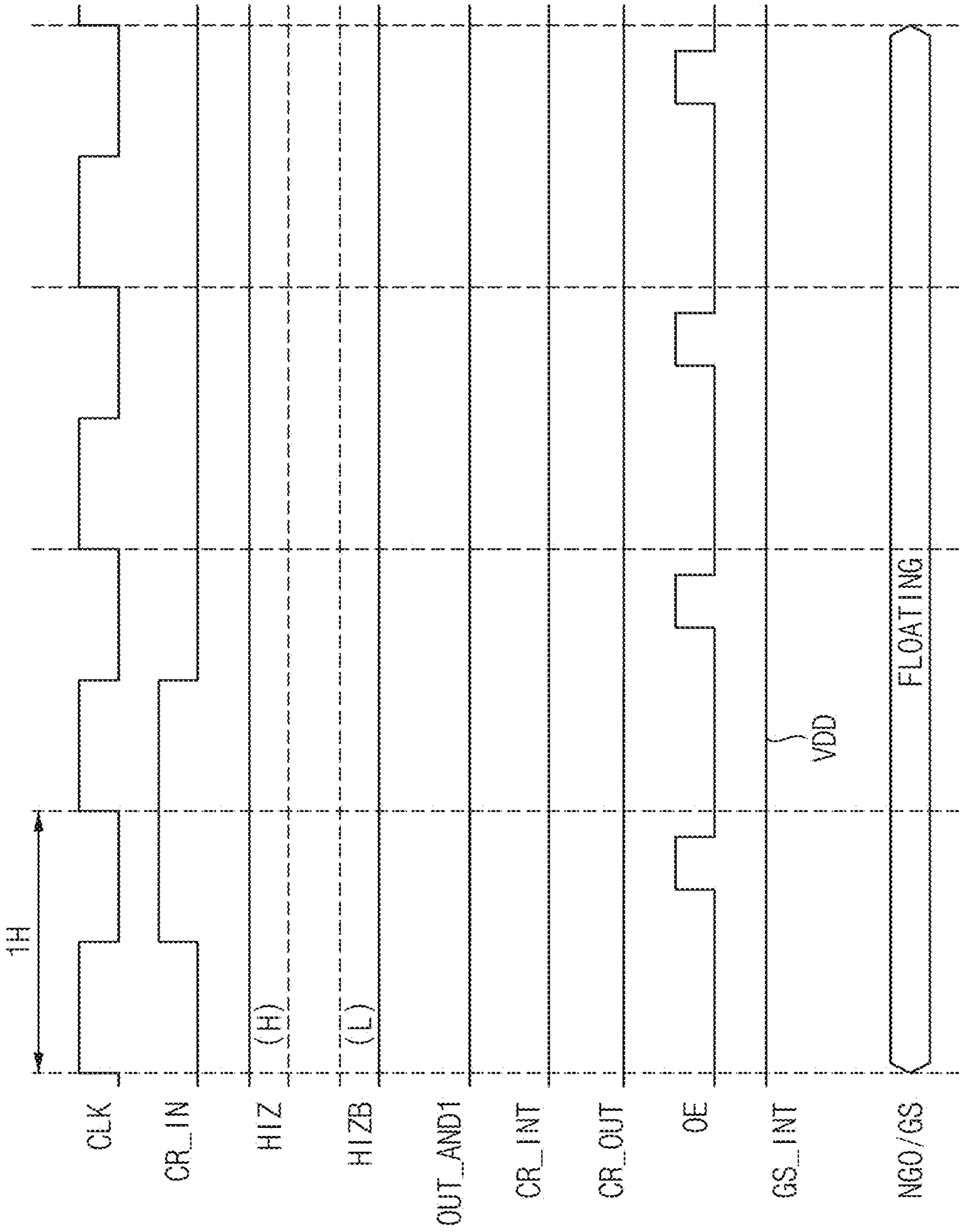
FIG. 8 is a timing diagram for describing an example of an operation of a stage of FIG. 4 when a high impedance signal has a second level.

FIG. 8 is a timing diagram for describing an example of an operation of a stage of FIG. 4 when a high impedance signal has a second level.

Referring to FIGS. 4 and 8, when the high impedance signal HIZ has the high level H and the inverted high impedance signal HIZB has the low level L, the first AND gate AND1 may output an output signal OUT_AND1 having the low power supply voltage VSS by performing a masking operation that converts the clock signal CLK that periodically toggles into the low power supply voltage VSS. Accordingly, the first and second flip-flops FF1 and FF2 may not operate, and power consumption of the logic circuit 220 may be reduced.

The first and second transmission gates TG1 and TG2 may be turned off in response to the high impedance signal HIZ having the high level H and the inverted high impedance signal HIZB having the low level L, the second PMOS transistor PT2 may be turned on in response to the inverted high impedance signal HIZB having the low level L, and the second NMOS transistor NT2 may be turned on in response to the high impedance signal HIZ having the high level H. The second PMOS transistor PT2 may transfer the high gate voltage VGH to the first control node NC1, and the second NMOS transistor NT2 may transfer the low gate voltage VGL to the second control node NC2. The first PMOS transistor PT1 may be turned off in response to the high gate voltage VGH of the first control node NC1, and the second NMOS transistor NT2 may be turned off in response to the low gate voltage VGL of the second control node NC2. Accordingly, the buffer circuit 260 may not output the gate signal GS, and may float the gate output node NGO such that the load of the gate line connected to the gate output node NGO may not increase.

Figure 9:
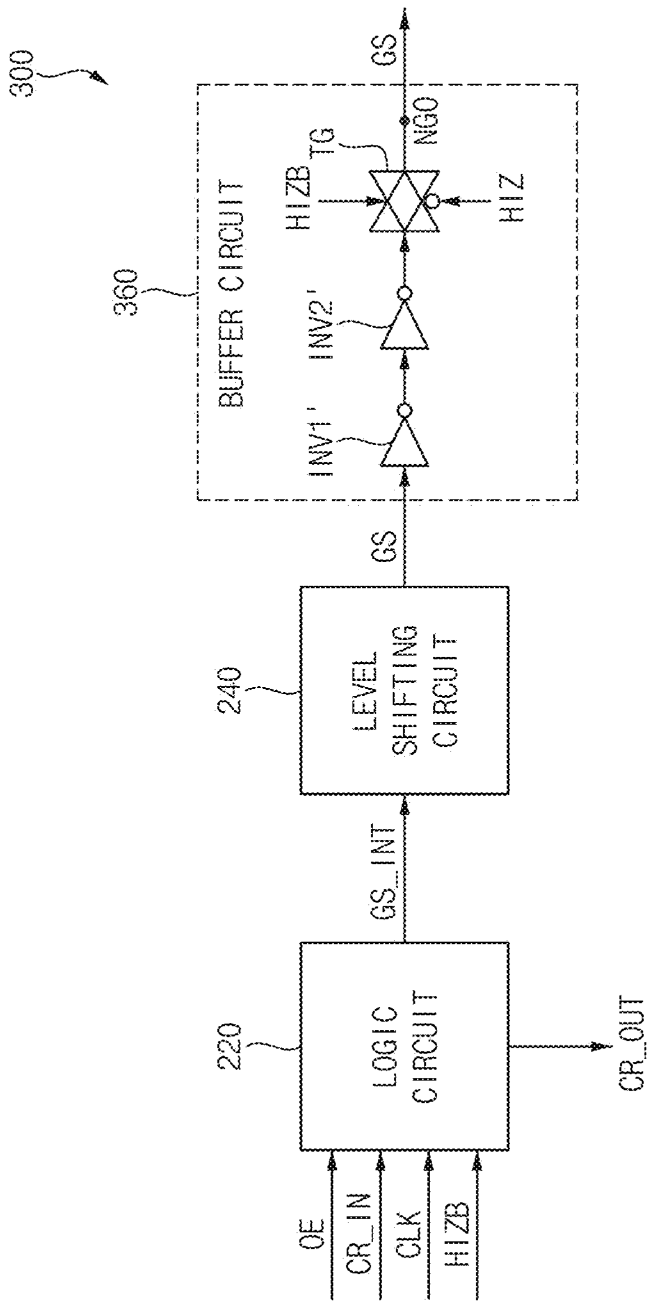
FIG. 9 is a circuit diagram illustrating a stage of a gate driver according to embodiments.

FIG. 9 is a circuit diagram illustrating a stage of a gate driver according to embodiments.

Referring to FIG. 9, a stage 300 of a gate driver according to embodiments may include a logic circuit 220, a level shifting circuit 240 and a buffer circuit 360. The stage 300 of FIG. 9 may have a similar configuration and a similar operation to a stage 200 of FIG. 4, except for a configuration of the buffer circuit 360.

The buffer circuit 360 may include a plurality of inverters INV1' and INV2' connected in series to buffer a gate signal GS, and a transmission gate TG that transfers a gate signal GS output from the plurality of inverters INV1' and INV2' to a gate output node NGO in response to a high impedance signal HIZ and an inverted high impedance signal HIZB. The transmission gate TG may output the gate signal GS output from the plurality of inverters INV1' and INV2' at the gate output node NGO when the high impedance signal HIZ has a first level (e.g., a low level L) and the inverted high impedance signal HIZB has a second level (e.g., a high level H), and may not output the gate signal GS at the gate output node NGO when the high impedance signal HIZ has the second level and the inverted high impedance signal HIZB has the first level. Thus, when the high impedance signal HIZ has the first level and the inverted high impedance signal HIZB has the second level, the stage 300 and the gate driver may be deactivated.

Figure 10:
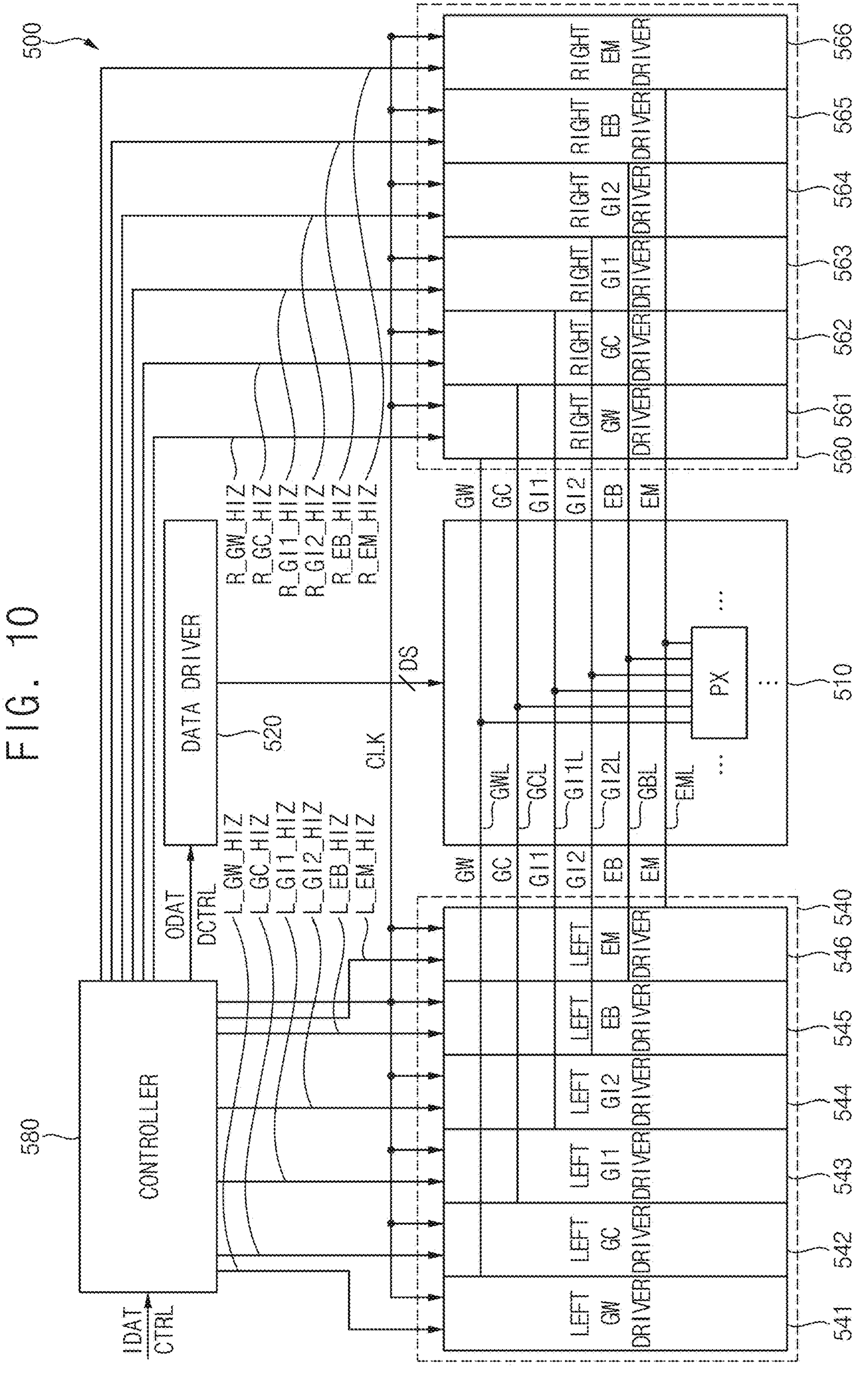
FIG. 10 is a block diagram illustrating a display device according to embodiments.
Figure 11:
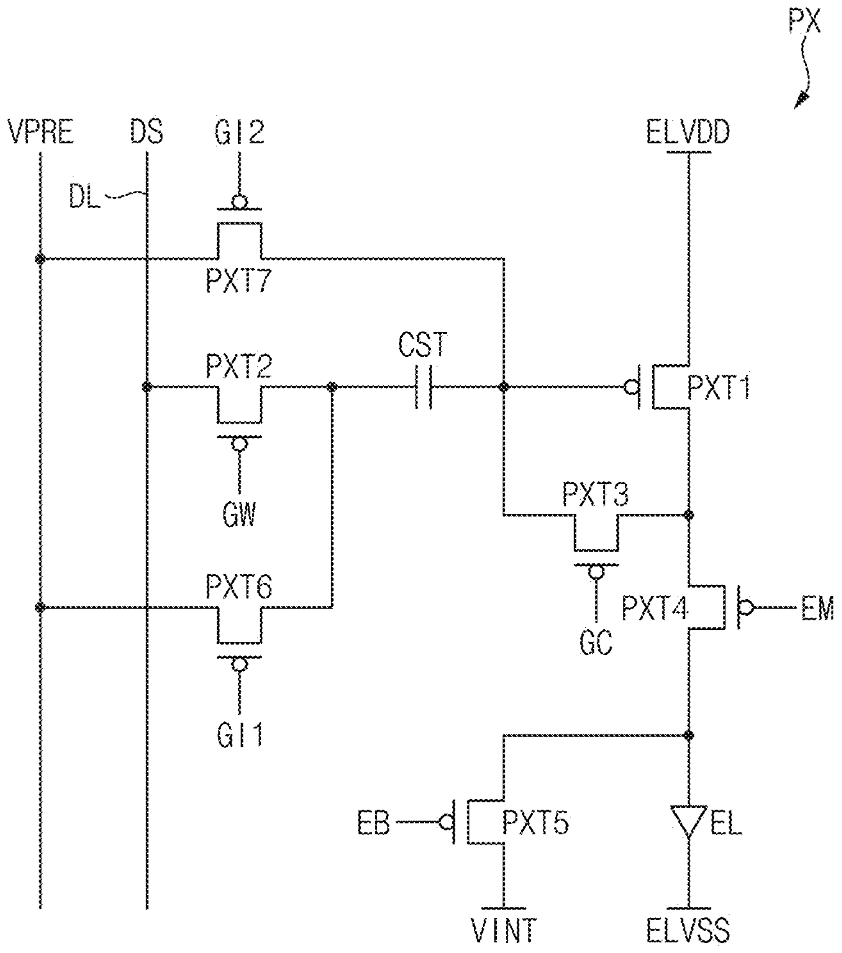
FIG. 11 is a circuit diagram illustrating an example of a pixel included in a display device according to embodiments.

FIG. 10 is a block diagram illustrating a display device according to embodiments, and FIG. 11 is a circuit diagram illustrating an example of a pixel included in a display device according to embodiments.

Referring to FIG. 10, a display device 500 according to embodiments may include a display panel 510 that includes a plurality of pixels PX, a data driver 520 that provides data signals DS to the plurality of pixels PX, a first gate driver 540 arranged on a first side (e.g., a left side) of the plurality of pixels PX and providing gate signals to the plurality of pixels PX, a second gate driver 560 arranged on a second side (e.g., a right side) of the plurality of pixels PX opposite to the first side and providing the gate signals to the plurality of pixels PX, and a controller 580 that controls the data driver 520, the first gate driver 540 and the second gate driver 560. Here, the gate signals may be the signals GW, GC, EM, EB, GI1, and GI2, and correspond to the gate signal GS in FIGS. 4 to 9.

The display panel 510 may include a plurality of gate lines, and a plurality of pixels PX connected to the plurality of gate lines. In some embodiments, the display panel 510 may include, as the plurality of gate lines, a plurality of write lines GWL, a plurality of compensation lines GCL, a plurality of first initialization lines GI1L, a plurality of second initialization lines GI2L, a plurality of anode initialization lines EBL and a plurality of emission lines EML. In some embodiments, as illustrated in FIG. 11, each pixel PX may include a capacitor CST, a first pixel transistor PXT1, a second pixel transistor PXT2, a third pixel transistor PXT3, a fourth pixel transistor PXT4, a fifth pixel transistor PXT5, a sixth pixel transistor PXT6, a seventh pixel transistor PXT7 and a light-emitting element EL.

The capacitor CST may include a first electrode connected to the second and sixth pixel transistors PXT2 and PXT6, and a second electrode connected to the first, third and seventh pixel transistors PXT1, PXT3 and PXT7.

The first pixel transistor PXT1 may generate a driving current based on a voltage of the second electrode of the capacitor CST. In some embodiments, the first pixel transistor PXT1 may include a gate connected to the second electrode of the capacitor CST, a first terminal which receives a first pixel power supply voltage ELVDD, and a second terminal connected to the third and fourth pixel transistors PXT3 and PXT4.

The second pixel transistor PXT2 may transfer the data signal DS to the first electrode of the capacitor CST in response to a write signal GW transferred through the write line GWL. In some embodiments, the second pixel transistor PXT2 may include a gate connected to the write line GWL, a first terminal connected to a data line DL, and a second terminal connected to the first electrode of a capacitor CST.

The third pixel transistor PXT3 may diode-connect the first pixel transistor PXT1 in response to a compensation signal GC transferred through the compensation line GCL. In some embodiments, the third pixel transistor PXT3 may include a gate connected to the compensation line GCL, a first terminal connected to the second terminal of the first pixel transistor PXT1, and a second terminal connected to the gate of the first pixel transistor PXT1.

The fourth pixel transistor PXT4 may provide the driving current to the light-emitting element EL in response to an emission signal EM transferred through the emission line EML. In some embodiments, the fourth pixel transistor PXT4 may include a gate connected to the emission line EML, a first terminal connected to the second terminal of the first pixel transistor PXT1, and a second terminal connected to the light-emitting element EL.

The fifth pixel transistor PXT5 may provide an initialization voltage VINT to an anode of the light-emitting element EL in response to an anode initialization signal EB transferred through the anode initialization line EBL. In some embodiments, the fifth pixel transistor PXT5 may include a gate connected to the anode initialization line EBL, a first terminal which receives the initialization voltage VINT, and a second terminal connected to the anode of the light-emitting element EL.

The sixth pixel transistor PXT6 may provide a pre-charge voltage VPRE to the first electrode of the capacitor CST in response to a first initialization signal GI1 transferred through the first initialization line GI1L. In some embodiments, the sixth pixel transistor PXT6 may include a gate connected to the first initialization line GI1L, a first terminal which receives the pre-charge voltage VPRE, and a second terminal connected to the first electrode of the capacitor CST.

The seventh pixel transistor PXT7 may provide the pre-charge voltage VPRE to the second electrode of the capacitor CST in response to a second initialization signal GI2 transferred through the second initialization line GI2L. In some embodiments, the seventh pixel transistor PXT7 may include a gate connected to the second initialization line GI2L, a first terminal which receives the pre-charge voltage VPRE, and a second terminal connected to the second electrode of the capacitor CST.

The light-emitting element EL may emit light based on the driving current generated by the first pixel transistor PXT1. In some embodiments, the light-emitting element EL may be, but is not limited to, an organic light-emitting diode ("OLED"). In other embodiments, the light-emitting element EL may be a nano light-emitting diode ("NED"), a quantum dot ("QD") light-emitting diode, a micro light-emitting diode, an inorganic light-emitting diode, or any other suitable light-emitting element. Further, in some embodiments, the light-emitting element EL may include an anode connected to the second terminal of the fourth pixel transistor PXT4, and a cathode which receives a second pixel power supply voltage ELVSS.

Although FIG. 11 illustrates an example of a pixel PX having a 7T1C structure, the pixel PX of the display device 500 according to embodiments is not limited to the example of FIG. 11.

The data driver 520 may generate the data signals DS based on output image data ODAT and a data control signal DCTRL received from the controller 580, and may provide the data signals DS to the plurality of pixels PX through a plurality of data lines. In some embodiments, the data control signal DCTRL may include, but is not limited to, an output data enable signal, a horizontal start signal and a load signal. In some embodiments, the data driver 520 and the controller 580 may be implemented as a single integrated circuit, and the single integrated circuit may be referred to as a timing controller embedded data driver ("TED"). In other embodiments, the data driver 520 and the controller 580 may be implemented as separate integrated circuits.

The first gate driver 540 may be arranged on the first side (e.g., the left side) of the plurality of pixels PX or on the first side (e.g., the left side) of the display panel 510, and may provide the gate signals to the plurality of pixels PX through the plurality of gate lines. In some embodiments, as illustrated in FIG. 10, the display device 500 may include, as the first gate driver 540, a left write driver 541 that provides the write signals GW to the plurality of pixels PX through the plurality of write lines GWL, a left compensation driver 542 that provides the compensation signals GC to the plurality of pixels PX through the plurality of compensation lines GCL, a left first initialization driver 543 that provides the first initialization signals GI1 to the plurality of pixels PX through the plurality of first initialization lines GI1L, a left second initialization driver 544 that provides the second initialization signals GI2 to the plurality of pixels PX through the plurality of second initialization lines GI2L, a left anode initialization driver 545 that provides the anode initialization signals EB to the plurality of pixels PX through the plurality of anode initialization lines EBL, and a left emission driver 546 that provides the emission signals EM to the plurality of pixels PX through the plurality of emission lines EML. The first gate driver 540, or each of the left write driver 541, the left compensation driver 542, the left first initialization driver 543, the left second initialization driver 544, the left anode initialization driver 545 and the left emission driver 546 may be a gate driver 100 of FIG. 1 including a stage 200 of FIG. 4 or a stage 300 of FIG. 9. Further, in some embodiments, the first gate driver 540, or each of the left write driver 541, the left compensation driver 542, the left first initialization driver 543, the left second initialization driver 544, the left anode initialization driver 545 and the left emission driver 546 may be integrated or formed in a left region of the display panel 510. In other embodiments, the first gate driver 540, or each of the left write driver 541, the left compensation driver 542, the left first initialization driver 543, the left second initialization driver 544, the left anode initialization driver 545 and the left emission driver 546 may be implemented as one or more integrated circuits, and may be connected to the left side of the display panel 510.

The second gate driver 560 may be arranged on the second side (e.g., the right side) opposite to the first side of the plurality of pixels PX, or on the second side (e.g., the right side) of the display panel 510, and may provide the gate signals to the plurality of pixels PX through the plurality of gate lines. In some embodiments, as illustrated in FIG. 10, the display device 500 may include, as the second gate driver 560, a right write driver 561 that provides the write signals GW to the plurality of pixels PX through the plurality of write lines GWL, the right compensation driver 562 that provides the compensation signals GC to the plurality of pixels PX through the plurality of compensation lines GCL, a right first initialization driver 563 that provides the first initialization signals GI1 to the plurality of pixels PX through the plurality of first initialization lines GI1L, a right second initialization driver 564 that provides the second initialization signals GI2 to the plurality of pixels PX through the plurality of second initialization lines GI2L, a right anode initialization driver 565 that provides the anode initialization signals EB to the plurality of pixels PX through the plurality of anode initialization lines EBL, and a right emission driver 566 that provides the emission signals EM to the plurality of pixels PX through the plurality of emission lines EML. The second gate driver 560, or each of the right write driver 561, the right compensation driver 562, the right first initialization driver 563, the right second initialization driver 564, the right anode initialization driver 565 and the right emission driver 566 may be the gate driver 100 of FIG. 1 including the stage 200 of FIG. 4 or the stage 300 of FIG. 9. Further, in some embodiments, the second gate driver 560, or each of the right write driver 561, the right compensation driver 562, the right first initialization driver 563, the right second initialization driver 564, the right anode initialization driver 565 and the right emission driver 566 may be integrated or formed in a right region of the display panel 510. In other embodiments, the second gate driver 560, or each of the right write driver 561, the right compensation driver 562, the right first initialization driver 563, the right second initialization driver 564, the right anode initialization driver 565 and the right emission driver 566 may be implemented as one or more integrated circuits, and may be connected to the right side of the display panel 510.

The controller 580 (e.g., a timing controller) may receive input image data IDAT and a control signal CTRL from an external processor (e.g., an application processor ("AP"), a graphics processing unit ("GPU") or a graphics card). In some embodiments, the control signal CTRL may include, but is not limited to, a vertical synchronization signal, a horizontal synchronization signal, an input data enable signal, a master clock signal, etc. The controller 580 may generate the output image data ODAT and the data control signal DCTRL based on the input image data IDAT and the control signal CTRL, and may control the data driver 520 by providing the output image data ODAT and the data control signal DCTRL to the data driver 520.

Further, the controller 580 may provide a start signal, a clock signal CLK, an output enable signal and a first high impedance signal to the first gate driver 540, and may provide the start signal, the clock signal CLK, the output enable signal and a second high impedance signal to the second gate driver 560. When both of the first high impedance signal and the second high impedance signal have a first level (e.g., a low level L), the first gate driver 540 and the second gate driver 560 may provide the gate signals to the plurality of pixels PX through the plurality of gate lines from opposite sides, or the first side (e.g., the left side) and the second side (e.g., the right side) of the plurality of pixels PX. When the first high impedance signal has the first level and the second high impedance signal has a second level (e.g., a high level H), the first gate driver 540 may provide the gate signals to the plurality of pixels PX through the plurality of gate lines from the first side of the plurality of pixels PX, and gate output nodes of a plurality of second stages of the second gate driver 560 may be floated. In this case, the plurality of second stages of the second gate driver 560 may perform a masking operation that converts the clock signal CLK applied to the plurality of second stages into a low power supply voltage. When the first high impedance signal has the second level and the second high impedance signal has the first level, the second gate driver 560 may provide the gate signals to the plurality of pixels PX through the plurality of gate lines from the second side of the plurality of pixels PX, and gate output nodes of a plurality of first stages of the first gate driver 540 may be floated. In this case, the plurality of first stages of the first gate driver 540 may perform a masking operation that converts the clock signal CLK applied to the plurality of first stages into the low power supply voltage. In some embodiments, not all of the first and second high impedance signals may have the second level, but at least one of the first and second high impedance signals may have the first level, so that at least one of the first gate driver 540 and the second gate driver 560 may be activated.

In some embodiments, as illustrated in FIG. 10, the controller 580 may provide the same clock signal CLK to the left and right write drivers 541 and 561, the left and right compensation drivers 542 and 562, the left and right first initialization drivers 543 and 563, the left and right second initialization drivers 544 and 564, the left and right anode initialization drivers 545 and 565, and the left and right emission drivers 546 and 566. Further, the controller 580 may provide left and right write high impedance signals L_GW_HIZ and R_GW_HIZ to the left and right write drivers 541 and 561, respectively, may provide left and right compensation high impedance signals L_GC_HIZ and R_GC_HIZ to the left and right compensation drivers 542 and 562, respectively, may provide left and right first initialization high impedance signals L_GI1_HIZ and R_GI1_HIZ to the left and right first initialization drivers 543 and 563, respectively, may provide left and right second initialization high impedance signals L_GI2_HIZ and R_GI2_HIZ to the left and right second initialization drivers 544 and 564, respectively, may provide left and right anode initialization high impedance signals L_EB_HIZ and R_EB_HIZ to the left and right anode initialization drivers 545 and 565, respectively, and may provide left and right emission high impedance signals L_EM_HIZ and R_EM_HIZ to the left and right emission drivers 546 and 566, respectively. Further, although it is not shown in FIG. 10, the controller 580 may further provide the same write start signal and the same write output enable signal to the left and right write drivers 541 and 561, may further provide the same compensation start signal and the same compensation output enable signal to the left and right compensation drivers 542 and 562, may further provide the same first initialization start signal and the same first initialization output enable signal to the left and right first initialization drivers 543 and 563, may further provide the same second initialization start signal and the same second initialization output enable signal to the left and right second initialization drivers 544 and 564, may further provide the same anode initialization start signal and the same anode initialization output enable signal to the left and right anode initialization drivers 545 and 565, and may further provide the same emission start signal and the same emission output enable signal to the left and right emission drivers 546 and 566.

In the display device 500 according to embodiments, the left and right write drivers 541 and 561 may be selectively activated in response to left and right write high impedance signals L_GW_HIZ and R_GW_HIZ, respectively, the left and right compensation drivers 542 and 562 may be selectively activated in response to left and right compensation high impedance signals L_GC_HIZ and R_GC_HIZ, respectively, the left and right first initialization drivers 543 and 563 may be selectively activated in response to left and right first initialization high impedance signals L_GI1_HIZ and R_GI1_HIZ, respectively, the left and right second initialization drivers 544 and 564 may be selectively activated in response to the left and right second initialization high impedance signals L_GI2_HIZ and R_GI2_HIZ, respectively, the left and right anode initialization drivers 545 and 565 may be selectively activated in response to the left and right anode initialization high impedance signals L_EB_HIZ and R_EB_HIZ, respectively, and the left and right emission drivers 546 and 566 may be selectively activated in response to the left and right emission high impedance signals L_EM_HIZ and R_EM_HIZ, respectively.

In a conventional display device, after evaluating an image quality of the conventional display device, either a double-side driving operation that provides gate signals from opposite sides of a display panel, or a single-side driving operation that provides the gate signals from one side of the display panel may be selected. Thus, in a case where the single-side driving operation is selected with respect to the conventional display device that was designed to perform the double-side driving operation, or in a case where the double-side driving operation is selected with respect to the conventional display device that was designed to perform the single-side driving operation, the conventional display device should be redesigned. However, the display device 500 according to embodiments may include the first and second gate drivers 540 and 560 arranged on the opposite sides of the display panel 510, and the first and second gate drivers 540 and 560 may be selectively activated in response to the first and second high impedance signals, respectively. Accordingly, even if the display device 500 is not redesigned, the display device 500 according to embodiments may selectively perform the double-side driving operation or the single-side driving operation.

Figure 12:
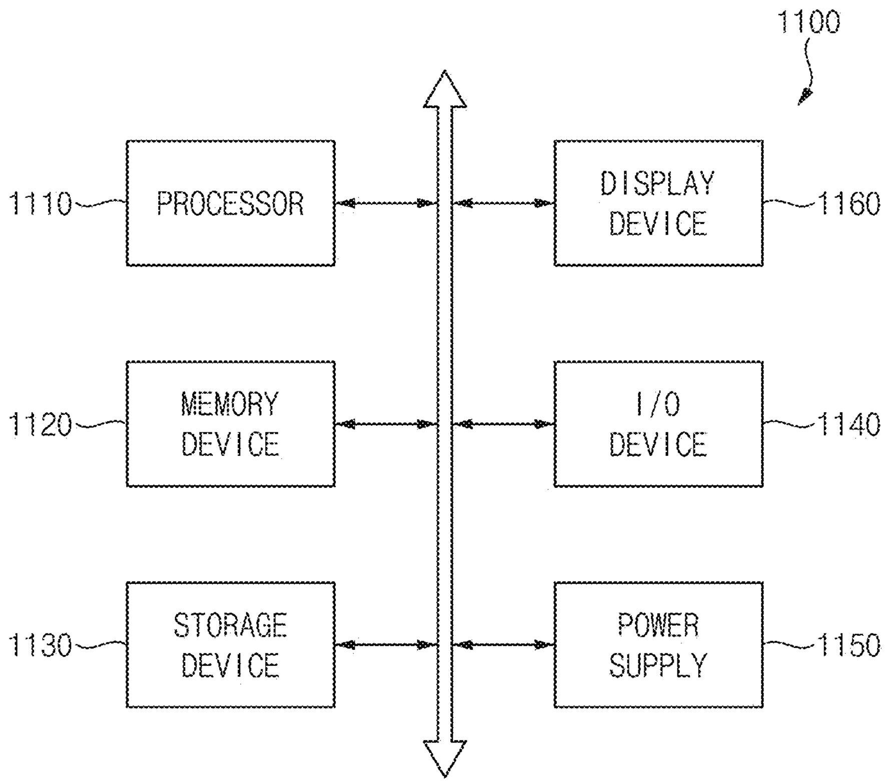
FIG. 12 is a block diagram illustrating an electronic device including a display device according to embodiments.

FIG. 12 is a block diagram illustrating an electronic device including a display device according to embodiments.

Referring to FIG. 12, an electronic device 1100 may include a processor 1110, a memory device 1120, a storage device 1130, an input/output (I/O) device 1140, a power supply 1150 and a display device 1160. The electronic device 1100 may further include a plurality of ports for communicating with a video card, a sound card, a memory card, a universal serial bus ("USB") device, other electric devices, etc.

The processor 1110 may perform various computing functions or tasks. The processor 1110 may be an application processor ("AP"), a micro-processor, a central processing unit ("CPU"), etc. The processor 1110 may be coupled to other components via an address bus, a control bus, a data bus, etc. Further, in some embodiments, the processor 1110 may be further coupled to an extended bus such as a peripheral component interconnection ("PCI") bus. The processor 1110 may provide the display device 1160 with the input image data IDAT.

The memory device 1120 may store data for operations of the electronic device 1100. For example, the memory device 1120 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile dynamic random access memory ("mobile DRAM") device, etc.

The storage device 1130 may be a solid state drive ("SSD") device, a hard disk drive ("HDD") device, a compact disc-read only memory ("CD-ROM") device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

The display device 1160 may include first and second gate drivers arranged on opposite sides (e.g., left and right sides) of a display panel, and the first and second gate drivers may be selectively activated in response to first and second high impedance signals, respectively. Accordingly, even if the display device 1160 is not redesigned, the display device according to embodiments may selectively perform a double-side driving operation that provides gate signals on opposite sides (e.g., left and right sides) of the display panel or a single-side driving operation that provides the gate signals on one side of the display panel.

The inventions may be applied any electronic device 1100 including the display device 1160. The display device 1160 may correspond to the display device 500. For example, the inventions may be applied to a virtual reality ("VR") device, an augmented reality ("AR") device, a mixed reality ("MR") device, an extended reality ("XR") device, a mobile phone, a smart phone, a television ("TV") (e.g., a digital TV, a three-dimensional ("3D") TV, etc.), a wearable electronic device, a personal computer ("PC") (e.g. a laptop computer, a tablet computer, etc.), a home appliance, a personal digital assistant ("PDA"), a portable multimedia player ("PMP"), a digital camera, a music player, a portable game console, a navigation device, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A gate driver including a plurality of stages, at least one stage of the plurality of stages comprising:

a logic circuit configured to generate an intermediate carry signal and a carry output signal by sampling a carry input signal based on a clock signal, and to generate an intermediate gate signal by performing a logic operation on an output enable signal, the intermediate carry signal and the carry output signal;

a level shifting circuit configured to generate a gate signal by shifting a voltage level of the intermediate gate signal; and a buffer circuit configured to output the gate signal at a gate output node when a high impedance signal has a first level, and to float the gate output node when the high impedance signal has a second level.

2. The gate driver of claim 1, wherein, while the high impedance signal has the second level, the logic circuit performs a masking operation, which converts the clock signal into a low power supply voltage.

3. The gate driver of claim 1, wherein the buffer circuit includes:

a first P-type metal-oxide-semiconductor (PMOS) transistor configured to output a high gate voltage as the gate signal at the gate output node in response to a voltage of a first control node;

a first N-type metal-oxide-semiconductor (NMOS) transistor configured to output a low gate voltage as the gate signal at the gate output node in response to a voltage of a second control node;

a second PMOS transistor configured to transfer the high gate voltage to the first control node in response to an inverted high impedance signal; and a second NMOS transistor configured to transfer the low gate voltage to the second control node in response to the high impedance signal.

4. The gate driver of claim 3, wherein the first PMOS transistor includes a gate connected to the first control node, a first terminal which receives the high gate voltage, and a second terminal connected to the gate output node, wherein the first NMOS transistor includes a gate connected to the second control node, a first terminal which receives the low gate voltage, and a second terminal connected to the gate output node, wherein the second PMOS transistor includes a gate which receives the inverted high impedance signal, a first terminal which receives the high gate voltage, and a second terminal connected to the first control node, and wherein the second NMOS transistor includes a gate which receives the high impedance signal, a first terminal which receives the low gate voltage, and a second terminal connected to the second control node.

5. The gate driver of claim 3, wherein the buffer circuit further includes:

a first inverter configured to generate an inverted gate signal by inverting the gate signal;

a first transmission gate configured to transfer the inverted gate signal to the first control node in response to the high impedance signal and the inverted high impedance signal; and a second transmission gate configured to transfer the inverted gate signal to the second control node in response to the high impedance signal and the inverted high impedance signal.

6. The gate driver of claim 1, wherein the logic circuit includes:

a first AND gate configured to perform an AND operation on the clock signal and an inverted high impedance signal;

a first flip-flop configured to output the intermediate carry signal by sampling the carry input signal at a rising edge of an output signal of the first AND gate;

a second inverter configured to invert the output signal of the first AND gate;

a second flip-flop configured to output the carry output signal by sampling the intermediate carry signal at a rising edge of an output signal of the second inverter;

a second AND gate configured to perform an AND operation on the output enable signal and the intermediate carry signal; and a NAND gate configured to generate the intermediate gate signal by performing a NAND operation on an output signal of the second AND gate and the carry output signal.

7. The gate driver of claim 1, wherein the level shifting circuit includes:

a first level shifter configured to convert a high power supply voltage of the intermediate gate signal into a high gate voltage when the intermediate gate signal has the high power supply voltage; and a second level shifter configured to convert a low power supply voltage of the intermediate gate signal into a low gate voltage when the intermediate gate signal has the low power supply voltage, and to output the gate signal, which has the high gate voltage or the low gate voltage.

8. The gate driver of claim 7, wherein the level shifting circuit further includes:

a third inverter configured to generate an inverted intermediate gate signal by inverting the intermediate gate signal, wherein the first level shifter includes:

a third NMOS transistor configured to transfer the low power supply voltage to a first node in response to the intermediate gate signal;

a fourth NMOS transistor configured to transfer the low power supply voltage to a second node in response to the inverted intermediate gate signal;

a third PMOS transistor configured to transfer the high gate voltage to the first node in response to a voltage of the second node;

a fourth PMOS transistor configured to transfer the high gate voltage to the second node in response to a voltage of the first node;

a fourth inverter configured to invert the voltage of the first node; and a fifth inverter configured to invert the voltage of the second node, and wherein the second level shifter includes:

a fifth PMOS transistor configured to transfer the high gate voltage to a third node in response to an output signal of the fourth inverter;

a sixth PMOS transistor configured to transfer the high gate voltage to a fourth node in response to an output signal of the fifth inverter;

a fifth NMOS transistor configured to transfer the low gate voltage to the third node in response to a voltage of the fourth node;

a sixth NMOS transistor configured to transfer the low gate voltage to the fourth node in response to a voltage of the third node;

a sixth inverter configured to generate the gate signal, which has the high gate voltage or the low gate voltage by inverting the voltage of the third node; and a seventh inverter configured to invert the voltage of the fourth node.

9. The gate driver of claim 8, wherein the third NMOS transistor includes a gate which receives the intermediate gate signal, a first terminal which receives the low power supply voltage, and a second terminal connected to the first node, wherein the fourth NMOS transistor includes a gate which receives the inverted intermediate gate signal, a first terminal which receives the low power supply voltage, and a second terminal connected to the second node, wherein the third PMOS transistor includes a gate connected to the second node, a first terminal which receives the high gate voltage, and a second terminal connected to the first node, wherein the fourth PMOS transistor includes a gate connected to the first node, a first terminal which receives the high gate voltage, and a second terminal connected to the second node, wherein the fifth PMOS transistor includes a gate connected to an output terminal of the fourth inverter, a first terminal which receives the high gate voltage, and a second terminal connected to the third node, wherein the sixth PMOS transistor includes a gate connected to an output terminal of the fifth inverter, a first terminal which receives the high gate voltage, and a second terminal connected to the fourth node, wherein the fifth NMOS transistor includes a gate connected to the fourth node, a first terminal which receives the low gate voltage, and a second terminal connected to the third node, and wherein the sixth NMOS transistor includes a gate connected to the third node, a first terminal which receives the low gate voltage, and a second terminal connected to the fourth node.

10. The gate driver of claim 1, wherein the buffer circuit includes:

a plurality of inverters connected in series, and configured to buffer the gate signal; and a transmission gate configured to transfer the gate signal output from the plurality of inverters to the gate output node in response to the high impedance signal and an inverted high impedance signal.

11. The gate driver of claim 10, wherein the transmission gate outputs the gate signal output from the plurality of inverters at the gate output node when the high impedance signal has the first level and the inverted high impedance signal has the second level, and wherein the transmission gate does not output the gate signal when the high impedance signal has the second level and the inverted high impedance signal has the first level.

12. An electronic device comprising:

a processor configured to provide input image data; and a display device configured to receive the input image data from the processor, and to display an image based on the input image data, the display device comprising:

a display panel including a plurality of gate lines, and a plurality of pixels connected to the plurality of gate lines;

a data driver configured to provide data signals to the plurality of pixels;

a first gate driver arranged on a first side of the plurality of pixels, and configured to provide gate signals to the plurality of pixels through the plurality of gate lines;

a second gate driver arranged on a second side of the plurality of pixels opposite to the first side, and configured to provide the gate signals to the plurality of pixels through the plurality of gate lines; and a controller configured to provide a start signal, a clock signal, an output enable signal and a first high impedance signal to the first gate driver, and to provide the start signal, the clock signal, the output enable signal and a second high impedance signal to the second gate driver, wherein the first gate driver includes a plurality of first stages, the second gate driver includes a plurality of second stages, and at least one stage among the plurality of first stages and the plurality of second stages includes:

a logic circuit configured to generate an intermediate carry signal and a carry output signal by sampling a carry input signal based on the clock signal, and to generate an intermediate gate signal by performing a logic operation on the output enable signal, the intermediate carry signal and the carry output signal;

a level shifting circuit configured to generate a gate signal corresponding to one of the gate signals by shifting a voltage level of the intermediate gate signal; and a buffer circuit configured to output the gate signal at a gate output node when a high impedance signal corresponding to one of the first high impedance signal and the second high impedance signal has a first level, and to float the gate output node when the high impedance signal has a second level.

13. The electronic device of claim 12, wherein, when both the first high impedance signal and the second high impedance signal have the first level, the first gate driver and the second gate driver provide the gate signals to the plurality of pixels through the plurality of gate lines from both the first side and the second side of the plurality of pixels, wherein, when the first high impedance signal has the first level and the second high impedance signal has the second level, the first gate driver provides the gate signals to the plurality of pixels through the plurality of gate lines from the first side of the plurality of pixels, and gate output nodes of the plurality of second stages of the second gate driver are floated, and wherein, when the first high impedance signal has the second level and the second high impedance signal has the first level, the second gate driver provides the gate signals to the plurality of pixels through the plurality of gate lines from the second side of the plurality of pixels, and gate output nodes of the plurality of first stages of the first gate driver are floated.

14. The electronic device of claim 12, wherein, when the first high impedance signal has the first level and the second high impedance signal has the second level, the plurality of second stages of the second gate driver perform a masking operation, which converts the clock signal applied to the plurality of second stages into a low power supply voltage, and wherein, when the first high impedance signal has the second level and the second high impedance signal has the first level, the plurality of first stages of the first gate driver perform a masking operation, which converts the clock signal applied to the plurality of first stages into the low power supply voltage.

15. The electronic device of claim 12, wherein the buffer circuit includes:

a first P-type metal-oxide-semiconductor (PMOS) transistor configured to output a high gate voltage as the gate signal at the gate output node in response to a voltage of a first control node;

a first N-type metal-oxide-semiconductor (NMOS) transistor configured to output a low gate voltage as the gate signal at the gate output node in response to a voltage of a second control node;

a second PMOS transistor configured to transfer the high gate voltage to the first control node in response to an inverted high impedance signal; and a second NMOS transistor configured to transfer the low gate voltage to the second control node in response to the high impedance signal.

16. The electronic device of claim 15, wherein the buffer circuit further includes:

a first inverter configured to generate an inverted gate signal by inverting the gate signal;

a first transmission gate configured to transfer the inverted gate signal to the first control node in response to the high impedance signal and the inverted high impedance signal; and a second transmission gate configured to transfer the inverted gate signal to the second control node in response to the high impedance signal and the inverted high impedance signal.

17. The electronic device of claim 12, wherein the buffer circuit includes:

a plurality of inverters connected in series, and configured to buffer the gate signal; and a transmission gate configured to transfer the gate signal output from the plurality of inverters to the gate output node in response to the high impedance signal and an inverted high impedance signal.

18. An electronic device comprising:

a processor configured to provide input image data; and a display device configured to receive the input image data from the processor, and to display an image based on the input image data, the display device comprising:

a display panel including a plurality of write lines, a plurality of compensation lines, a plurality of first initialization lines, a plurality of second initialization lines, a plurality of anode initialization lines, a plurality of emission lines and a plurality of pixels;

a data driver configured to provide data signals to the plurality of pixels;

left and right write drivers arranged on left and right sides of the plurality of pixels, respectively, and configured to provide write signals to the plurality of pixels through the plurality of write lines;

left and right compensation drivers arranged on the left and right sides of the plurality of pixels, respectively, and configured to provide compensation signals to the plurality of pixels through the plurality of compensation lines;

left and right first initialization drivers arranged on the left and right sides of the plurality of pixels, respectively, and configured to provide first initialization signals to the plurality of pixels through the plurality of first initialization lines;

left and right second initialization drivers arranged on the left and right sides of the plurality of pixels, respectively, and configured to provide second initialization signals to the plurality of pixels through the plurality of second initialization lines;

left and right anode initialization drivers arranged on the left and right sides of the plurality of pixels, respectively, and configured to provide anode initialization signals to the plurality of pixels through the plurality of anode initialization lines;

left and right emission drivers arranged on the left and right sides of the plurality of pixels, respectively, and configured to provide emission signals to the plurality of pixels through the plurality of emission lines; and a controller configured to provide a same clock signal to the left and right write drivers, the left and right compensation drivers, the left and right first initialization drivers, the left and right second initialization drivers, the left and right anode initialization drivers, and the left and right emission drivers, to provide left and right write high impedance signals to the left and right write drivers, respectively, to provide left and right compensation high impedance signals to the left and right compensation drivers, respectively, to provide left and right first initialization high impedance signals to the left and right first initialization drivers, respectively, to provide left and right second initialization high impedance signals to the left and right second initialization drivers, respectively, to provide left and right anode initialization high impedance signals to the left and right anode initialization drivers, respectively, and to provide left and right emission high impedance signals to the left and right emission drivers, respectively, wherein each of the left and right write drivers, the left and right compensation drivers, the left and right first initialization drivers, the left and right second initialization drivers, the left and right anode initialization drivers, and the left and right emission drivers includes a plurality of stages, and wherein at least one stage of the plurality of stages includes:

a logic circuit configured to generate an intermediate carry signal and a carry output signal by sampling a carry input signal based on the clock signal, and to generate an intermediate gate signal by performing a logic operation on the output enable signal, the intermediate carry signal and the carry output signal;

a level shifting circuit configured to generate a gate signal corresponding to one of the write signals, the compensation signals, the first initialization signals, the second initialization signals, the anode initialization signals and the emission signals by shifting a voltage level of the intermediate gate signal; and a buffer circuit configured to output the gate signal at a gate output node when a high impedance signal corresponding to one of the left and right write high impedance signals, the left and right compensation high impedance signals, the left and right first initialization high impedance signals, the left and right second initialization high impedance signals, the left and right anode initialization high impedance signals, and the left and right emission high impedance signals has a first level, and to float the gate output node when the high impedance signal has a second level.

19. The electronic device of claim 18, wherein the left and right write drivers are selectively activated in response to the left and right write high impedance signals, respectively, wherein the left and right compensation drivers are selectively activated in response to the left and right compensation high impedance signals, respectively, wherein the left and right first initialization drivers are selectively activated in response to the left and right first initialization high impedance signals, respectively, wherein the left and right second initialization drivers are selectively activated in response to the left and right second initialization high impedance signals, respectively, wherein the left and right anode initialization drivers are selectively activated in response to the left and right anode initialization high impedance signals, respectively, and wherein the left and right emission drivers are selectively activated in response to the left and right emission high impedance signals, respectively.

20. The electronic device of claim 18, wherein each of the plurality of pixels includes:

a capacitor including a first electrode and a second electrode;

a first pixel transistor configured to generate a driving current based on a voltage of the second electrode of the capacitor;

a second pixel transistor configured to transfer a corresponding one of the data signals to the first electrode of the capacitor in response to a corresponding one of the write signals;

a third pixel transistor configured to diode-connect the first pixel transistor in response to a corresponding one of the compensation signals;

a fourth pixel transistor configured to provide the driving current to a light-emitting element in response to a corresponding one of the emission signals;

a fifth pixel transistor configured to provide an initialization voltage to an anode of the light-emitting element in response to a corresponding one of the anode initialization signals;

a sixth pixel transistor configured to provide a pre-charge voltage to the first electrode of the capacitor in response to a corresponding one of the first initialization signals;

a seventh pixel transistor configured to provide the pre-charge voltage to the second electrode of the capacitor in response to a corresponding one of the second initialization signals; and the light-emitting element configured to emit light based on the driving current generated by the first pixel transistor.

* * * * *